(12) United States Patent
Stein

(10) Patent No.: US 10,754,041 B2
(45) Date of Patent: Aug. 25, 2020

(54) IDENTIFYING AND PARTITIONING LEGITIMATE GNSS SATELLITE SIGNALS FROM ILLEGITIMATE GNSS SATELLITE SIGNALS USING A CONTRARIO METHOD

(71) Applicant: The MITRE Corporation, McLean, VA (US)

(72) Inventor: David W. J. Stein, McLean, VA (US)

(73) Assignee: The MITRE Corporation, McLean, VA (US)

(*) Notice: Subject to any disclaimer, the term of this patent is extended or adjusted under 35 U.S.C. 154(b) by 207 days.

(21) Appl. No.: 16/147,226

(22) Filed: Sep. 28, 2018

(65) Prior Publication Data

US 2020/0103533 A1    Apr. 2, 2020

(51) Int. Cl.
*G01S 19/07* (2010.01)
*G01S 19/21* (2010.01)
(Continued)

(52) U.S. Cl.
CPC .......... *G01S 19/215* (2013.01); *G01S 19/07* (2013.01); *G01S 19/08* (2013.01); *G01S 19/22* (2013.01); *G01S 19/243* (2013.01)

(58) Field of Classification Search
CPC ........ G01S 19/215; G01S 19/07; G01S 19/08; G01S 19/243; G01S 19/21; G01S 19/30; G01S 19/32; G01S 19/36
(Continued)

(56) References Cited

U.S. PATENT DOCUMENTS

| 5,808,581 A | 9/1998 | Braisted et al. |
| 6,864,836 B1 | 3/2005 | Hatch et al. |

(Continued)

FOREIGN PATENT DOCUMENTS

CN    106707304    5/2017

OTHER PUBLICATIONS

Khanafseh, S. et al. (2014) "GPS Spoofing Detection Using RAIM with INS Coupling," Position, Location and Navigation Symposium—PLANS 2014, May 5-8, Monterey, California; pp. 1232-1239.
(Continued)

*Primary Examiner* — Harry K Liu
(74) *Attorney, Agent, or Firm* — Morrison & Foerster LLP

(57) ABSTRACT

Provided are systems, methods, and devices for identifying correct satellite signals to improve the accuracy of a satellite navigation system. In some embodiments, identifying correct satellite signals may include receiving a plurality of satellite signals; demodulating the satellite signals to extract a first plurality of parameters; determining a first subset of parameters from the first plurality of parameters, wherein the first subset of parameters is based on a first geographic location; determining a second subset of parameters from a second plurality of parameters outside the first subset, the second plurality of parameters comprising one or more parameters of the first plurality of parameters outside the first subset, wherein the second subset of parameters is based on a second geographic location; and identifying an exemplary subset from the first subset and the second subset, wherein the exemplary subset comprises parameters corresponding to correct satellite signals.

36 Claims, 9 Drawing Sheets

(51) Int. Cl.
      *G01S 19/24*    (2010.01)
      *G01S 19/08*    (2010.01)
      *G01S 19/22*    (2010.01)

(58) Field of Classification Search
    USPC .................................................. 342/357.59
    See application file for complete search history.

(56) References Cited

U.S. PATENT DOCUMENTS

| | | | |
|---|---|---|---|
| 7,286,083 B2 | 10/2007 | Xie et al. | |
| 7,783,425 B1* | 8/2010 | Hwang | G01S 19/20 |
| | | | 701/1 |
| 7,912,643 B1 | 3/2011 | Bean et al. | |
| 8,610,624 B2 | 12/2013 | Savoy | |
| 9,146,320 B2 | 9/2015 | Najim et al. | |
| 9,720,095 B2 | 8/2017 | Rife | |
| 2005/0114023 A1* | 5/2005 | Williamson | G01S 19/47 |
| | | | 701/472 |
| 2011/0320152 A1* | 12/2011 | Vourc'h | G01S 19/47 |
| | | | 702/92 |
| 2014/0070988 A1* | 3/2014 | Peck | G01S 19/20 |
| | | | 342/357.24 |
| 2016/0178752 A1 | 6/2016 | Davies et al. | |

OTHER PUBLICATIONS

Wang, E. et al. (Mar. 2018) "Fault Detection and Isolation in GPS Receiver Autonomous Integrity Monitoring Based on Chaos Particle Swarm Optimization-Particle Filter Algorithm," Advances in Space Research 61(5):1260-1272.

* cited by examiner

IDENTIFYING AND PARTITIONING LEGITIMATE GNSS SATELLITE SIGNALS FROM ILLEGITIMATE GNSS SATELLITE SIGNALS USING A CONTRARIO METHOD

FIELD OF THE INVENTION

This disclosure relates to identifying legitimate satellite signals, and, particularly, to using an a contrario method for identifying legitimate satellite signals.

BACKGROUND OF THE INVENTION

The accuracy of satellite navigation systems (i.e., Global Navigation Satellite Systems (GNSSs)) rely on legitimate satellite signals. For example, a legitimate satellite signal can be a signal transmitted by a satellite and received by a receiver to communicate time and location information unique to the transmitting satellite. However, various types of illegitimate satellite signals can adversely affect the accuracy of satellite location systems. For example, in urban areas, buildings may get in the way of a direct signal path, causing a faulted signal. Similarly, in mountainous regions, the topography can interfere with a signal's path. Spoofed signals can send false information to a signal receiver. For example, someone may generate spoofed signals that communicate false satellite transmission times or false satellite velocities. If the receiver has no way of rejecting these spoofed signals, it may accept the faulted and/or spoofed signals, causing inaccuracies in the satellite navigation systems.

The consequences of spoofed signals in particular can be detrimental. For example, a spoofer (i.e., a person generating spoofed signals) can cause any vehicle (e.g,. airplane, unmanned aerial vehicle, automobile) using a satellite navigation system to navigate off-path and/or crash. Spoofers can cause such navigation problems in both civilian applications as well as in military applications—anywhere a vehicle is using a satellite navigation system.

Current technologies that can help protect satellite navigation systems against illegitimate signals include RAIM (Receiver Autonomous Integrity Monitoring) and ARAIM (Advanced Receiver Autonomous Integrity Monitoring). These systems are able to detect and exclude fault signals, but are limited in their ability to detect and exclude high numbers of fault or spoofed signals. Further, these systems were developed to detect fault signals from a small number of satellites at any given time.

Random Identify Exemplary (RANSAC) can identify fault or spoofed signals by performing an exhaustive identifying on the data. However, RANSAC is only capable of identifying outlier parameters (i.e., illegitimate signals), and is not capable of identifying legitimate signals. Further, the RANSAC algorithm can compute an inlier and an outlier set for every subset of parameters of a plurality of parameters corresponding to a plurality of satellite signals. The parameters associated with the smallest subset of consistent outliers correspond to the most correct satellite signals.

Other signal-identifying algorithms and technologies can analyze pseudo-range or pseudo-range-rate data, but not both types of data.

SUMMARY OF THE INVENTION

Provided are systems, methods, and techniques for identifying and excluding illegitimate satellite signals from a satellite navigation system. By using an a contrario approach, methods, systems, and techniques provided herein can identify and exclude illegitimate satellite signals. Thus, embodiments provided can be used to improve the accuracy of satellite navigation systems.

The accuracy of any navigation system is imperative in both civilian and in military applications. Any vehicle (e.g., automobile, airplane, unmanned aerial vehicle, etc.) operating based on a satellite navigation system risks the safety of its operators, passengers, and/or stand-byers who may be affected if the vehicle runs off-course. Accordingly, the disclosed methods may identify, from a plurality of satellite signals, subsets of signals consistent with a legitimate geographic location (e.g., legitimate satellite signals) and subsets of signals consistent with an illegitimate geographic location (e.g., faulted and/or spoofed satellite signals). The methods may identify an exemplary subset as the subset most representative of a legitimate geographic location. A satellite navigation system may, based upon this exemplary subset of satellite signals, determine a geographic location of a receiver with increased accuracy.

Unlike the RAIM, ARAIM, and RANSAC methods described above, methods disclosed herein can analyze pseudo-range and pseudo-range-rate parameters, and can identify accurate parameters without exhaustive identifying. In particular, methods disclosed can apply an a contrario approach to identify, from a plurality of satellite signals, a subset of signals consistent with a single geographic location. An a contrario approach is used to identify inlier parameters, whereas an anomaly detection approach (i.e., the opposite of an a contrario approach) is used to identify outliers. According to methods provided herein, an a contrario approach may be used to identify and partition satellite signals consistent with a first geographic location from satellite signals consistent with a second geographic location. For example, methods can include identifying one or more subsets of signals from a plurality of parameters, identifying additional parameters from the plurality of parameters consistent with the one or more subsets, identifying an exemplary subset from the one or more subsets as the exemplary set, and using the exemplary set in a satellite navigation system to identify a receiver position with improved accuracy.

In some embodiments, a pseudo-range or pseudo-range and pseudo-range-rate parameters may be received from a plurality of satellites. Methods provided may identify the pseudo-range or pseudo-range and pseudo-range-rate parameters of a plurality of parameters to identify one or more subsets of parameters from the plurality of parameters. One or more inlier parameters may be identified as consistent with a subset of parameters based on an a contrario score and a Kullback-Liebler (KL) divergence score for each of the remaining parameters of the plurality of parameters not within the subset. Subsets can be identified and inlier parameters corresponding to a subset identified using a recursive process until a predetermined number has been analyzed or a threshold value has been met. These parameters associated with a subset and its inlier parameters can be removed from the pseudo-range or pseudo-range and pseudo-range-rate plurality of parameters, and the above process may be repeated until no consistent parameters can be identified to generate a subset.

In some embodiments, once all the consistent subsets have been identified and identified from the plurality of parameters, an exemplary subset can be identified and used to generate an exemplary subset. The exemplary subset may be the subset that is the most consistent subset based on the a contrario and/or KL divergence scores of that subset. An exemplary subset comprises the exemplary subset and its associated exemplary inlier parameters.

The exemplary set may be used by a satellite navigation system to identify a receiver location and/or velocity with improved accuracy.

In some embodiments, a method of identifying correct satellite signals to improve the accuracy of a satellite navigation system is provided, the method comprising receiving a plurality of satellite signals; demodulating the plurality of satellite signals to extract a first plurality of parameters; determining a first subset of parameters from the first plurality of parameters corresponding to the plurality of satellite signals, wherein the first subset of parameters is based on a first geographic location, comprising: calculating an a contrario score for one or more parameters of the first plurality of parameters outside the first subset; calculating a KL divergence score for one or more parameters of the first plurality of parameters outside the first subset; and identifying, based on the a contrario score and the KL divergence score, one or more inlier parameters from one or more parameters of the first plurality of parameters outside the first subset; and determining a second subset of parameters from a second plurality of parameters outside the first subset, the second plurality of parameters comprising one or more parameters of the first plurality of parameters outside the first subset, wherein the second subset of parameters is based on a second geographic location, comprising: calculating an a contrario score for one or more parameters of the second plurality of parameters outside the second subset; calculating a KL divergence score for one or more parameters of the second plurality of parameters outside the second subset; and identifying, based on the a contrario score and the KL divergence score, one or more inlier parameters of the second plurality of parameters; and identifying an exemplary subset from the first subset and the second subset based on the a contrario score and KL divergence score for the first subset and the second subset, wherein the exemplary subset comprises parameters corresponding to correct satellite signals.

In some embodiments of the method of identifying correct satellite signals to improve the accuracy of a satellite navigation system, correct satellite signals comprise one or more of a multipath satellite signal or a line-of-sight satellite signal.

In some embodiments of the method of identifying correct satellite signals to improve the accuracy of a satellite navigation system, determining a first subset of parameters from the first plurality of parameters corresponding to the plurality of satellite signals comprises calculating a state vector based on the parameters of the first subset, and determining a second subset of parameters from a second plurality of parameters comprises calculating a state vector based on the parameters of the second subset.

In some embodiments of the method of identifying correct satellite signals to improve the accuracy of a satellite navigation system, determining a first subset of parameters from the first plurality of parameters corresponding to the plurality of satellite signals comprises: identifying four parameters based on a single geographic location from the first plurality of parameters; and verifying the state vector based on the parameters of the first subset using extrinsic information from one or more of an inertial measurement calculator, a clock, or a barometer.

In some embodiments of the method of identifying correct satellite signals to improve the accuracy of a satellite navigation system, determining a first subset of parameters from the first plurality of parameters corresponding to the plurality of satellite signals comprises: identifying four parameters based on a single geographic location from the first plurality of parameters; and verifying the state vector based on the parameters of the first subset with a fifth measurement from the first plurality of parameters.

In some embodiments of the method of identifying correct satellite signals to improve the accuracy of a satellite navigation system, the first plurality of parameters comprises one or more of pseudo-range or pseudo-range-rate parameters.

In some embodiments of the method of identifying correct satellite signals to improve the accuracy of a satellite navigation system, the first geographic location and the second geographic location each comprise one of a legitimate geographic location, a spoofed geographic location, or a faulted geographic location.

In some embodiments of the method of identifying correct satellite signals to improve the accuracy of a satellite navigation system, the method comprises from a third plurality of parameters, the third plurality of parameters outside the first subset of parameters and the second subset of parameters: identifying a fourth subset of parameters, wherein the fourth subset of parameters is based on two or more geographic locations.

In some embodiments of the method of identifying correct satellite signals to improve the accuracy of a satellite navigation system, identifying an exemplary subset from the first subset and the second subset based on the a contrario score and KL divergence score for the first subset and the second subset comprises: identifying the exemplary subset from the first subset and the second subset, the exemplary subset having a lowest a contrario score and a highest KL divergence score; and identifying one or more consensus inlier parameters from the first plurality of parameters based on the exemplary subset having the lowest a contrario score and the highest KL divergence score.

In some embodiments of the method of identifying correct satellite signals to improve the accuracy of a satellite navigation system, identifying an exemplary subset from the first subset and the second subset based on the a contrario score and KL divergence score for the first subset and the second subset comprises identifying consensus inlier parameters from the first plurality of parameters, wherein the exemplary subset and the consensus inlier parameters comprise parameters corresponding to correct satellite signals.

In some embodiments of the method of identifying correct satellite signals to improve the accuracy of a satellite navigation system, calculating an a contrario score for one or more parameters of the first plurality of parameters outside the first subset comprises generating a chi-squared distribution based upon error measurements between the one or more parameters of the first plurality of parameters outside the first subset and predicted parameters based on the state vector corresponding to the first subset.

In some embodiments of the method of identifying correct satellite signals to improve the accuracy of a satellite navigation system, the KL divergence score for one or more parameters of the first plurality of parameters outside the first subset is based on a distribution of the one or more parameters of the first plurality of parameters outside the first subset and a distribution of predicted parameters based on the state vector corresponding to the first subset.

In some embodiments, a system for identifying correct satellite signals to improve the accuracy of a satellite navigation system is provided, the system comprising: one or more processors and memory storing one or more programs that when executed by the one or more processors cause the one or more processors to: receive a plurality of satellite signals; demodulate the plurality of satellite signals to form a first plurality of parameters corresponding to the plurality of satellite signals; determine a first subset of parameters from the first plurality of parameters corresponding to the plurality of satellite signals, wherein the first subset of parameters is based on a first geographic location, comprising: calculate an a contrario score for one or more parameters of the first plurality of parameters outside the first subset; calculate a KL divergence score for one or more parameters of the first plurality of parameters outside the first subset; and identify, based on the a contrario score and the KL divergence score, one or more inlier parameters from one or more parameters of the first plurality of parameters outside the first subset; and determine a second subset of parameters from a second plurality of parameters outside the first subset, the second plurality of parameters comprising one or more parameters of the first plurality of parameters outside the first subset, wherein the second subset of parameters is based on a second geographic location, comprising: calculate an a contrario score for one or more parameters of the second plurality of parameters outside the second subset; calculate a KL divergence score for one or more parameters of the second plurality of parameters outside the second subset; and identify, based on the a contrario score and the KL divergence score, one or more inlier parameters of the second plurality of parameters; and identify an exemplary subset from the first subset and the second subset based on the a contrario score and KL divergence score for the first subset and the second subset, wherein the exemplary subset comprises parameters corresponding to correct satellite signals.

In some embodiments of the system for identifying correct satellite signals to improve the accuracy of a satellite navigation system, correct satellite signals comprise one or more of a multipath satellite signal or a line-of-sight satellite signal.

In some embodiments of the system for identifying correct satellite signals to improve the accuracy of a satellite navigation system, determine a first subset of parameters from the first plurality of parameters corresponding to the plurality of satellite signals comprises calculate a state vector based on the parameters of the first subset, and determining a second subset of parameters from a second plurality of parameters comprises calculate a state vector based on the parameters of the second subset.

In some embodiments of the system for identifying correct satellite signals to improve the accuracy of a satellite navigation system, determine a first subset of parameters from the first plurality of parameters corresponding to the plurality of satellite signals comprises identify four parameters based on a single geographic location from the first plurality of parameters; and verify the state vector based on the parameters of the first subset with extrinsic information from one or more of an inertial measurement calculator, a clock, or a barometer.

In some embodiments of the system for identifying correct satellite signals to improve the accuracy of a satellite navigation system, determine a first subset of parameters from the first plurality of parameters corresponding to the plurality of satellite signals comprises: identify four parameters based on a single geographic location from the first plurality of parameters; and verify the state vector based on the parameters of the first subset with a fifth measurement from the plurality of parameters.

In some embodiments of the system for identifying correct satellite signals to improve the accuracy of a satellite navigation system, the first plurality of parameters comprises one or more of pseudo-range or pseudo-range-rate parameters.

In some embodiments of the system for identifying correct satellite signals to improve the accuracy of a satellite navigation system, the first geographic location and the second geographic location each comprise one of a correct geographic location, a spoofed geographic location, or a faulted geographic location.

In some embodiments of the system for identifying correct satellite signals to improve the accuracy of a satellite navigation system, the system comprises from a third plurality of parameters, the third plurality of parameters outside the first subset of parameters and the second subset of parameters: identify a fourth subset of parameters, wherein the fourth subset of parameters is based on two or more geographic locations.

In some embodiments of the system for identifying correct satellite signals to improve the accuracy of a satellite navigation system, identify an exemplary subset from the first subset and the second subset based on the a contrario score and KL divergence score for the first subset and the second subset comprises: identify the exemplary subset from the first subset and the second subset, the exemplary subset having a lowest a contrario score and a highest KL divergence score; and identify one or more consensus inlier parameters from the first plurality of parameters based on the exemplary subset having the lowest a contrario score and the highest KL divergence score.

In some embodiments of the system for identifying correct satellite signals to improve the accuracy of a satellite navigation system, identify an exemplary subset from the first subset and the second subset based on the a contrario score and KL divergence score for the first subset and the second subset comprises identify consensus inlier parameters from the first plurality of parameters, wherein the exemplary subset and the consensus inlier parameters comprise parameters corresponding to correct satellite signals.

In some embodiments of the system for identifying correct satellite signals to improve the accuracy of a satellite navigation system, calculate an a contrario score for one or more parameters of the first plurality of parameters outside the first subset comprises generate a chi-squared distribution based upon error measurements between the one or more parameters of the first plurality of parameters outside the first subset and predicted parameters based on the state vector corresponding to the first subset.

In some embodiments of the system for identifying correct satellite signals to improve the accuracy of a satellite navigation system, the KL divergence score for one or more parameters of the first plurality of parameters outside the first subset is based on a distribution of the one or more parameters of the first plurality of parameters outside the first subset and a distribution of predicted parameters based on the state vector corresponding to the first subset.

In some embodiments, a device for identifying correct satellite signals to improve the accuracy of a satellite navigation system is provided, the device comprising: a receiver configured to receive a plurality of satellite signals; a processor configured to: demodulate the plurality of satellite signals to form a first plurality of parameters corresponding to the plurality of satellite signals; determine a first subset of parameters from the first plurality of parameters corresponding to the plurality of satellite signals, wherein the first subset of parameters is based on a first geographic location, comprising: calculate an a contrario score for one or more parameters of the first plurality of parameters outside the first subset; calculate a KL divergence score for one or more parameters of the first plurality of parameters outside the first subset; and identify, based on the a contrario score and the KL divergence score, one or more inlier parameters from one or more parameters of the first plurality of parameters outside the first subset; and determine a second subset of parameters from a second plurality of parameters outside the first subset, the second plurality of parameters comprising one or more parameters of the first plurality of parameters outside the first subset, wherein the second subset of parameters is based on a second geographic location, comprising: calculate an a contrario score for one or more parameters of the second plurality of parameters outside the second subset; calculate a KL divergence score for one or more parameters of the second plurality of parameters; and identify, based on the a contrario score and the KL divergence score, one or more inlier parameters of the plurality of parameters outside the first subset; identify an exemplary subset from the first subset and the second subset based on the a contrario score and KL divergence score for the first subset and the second subset; and a memory configured to store the exemplary subset, wherein the exemplary subset comprises parameters corresponding to correct satellite signals.

In some embodiments of the device for identifying correct satellite signals to improve the accuracy of a satellite navigation system, correct satellite signals comprise one or more of a multipath satellite signal or a line-of-sight satellite signal.

In some embodiments of the device for identifying correct satellite signals to improve the accuracy of a satellite navigation system, determine a first subset of parameters from the first plurality of parameters corresponding to the plurality of satellite signals comprises calculate a state vector based on the parameters of the first subset, and determine a second subset of parameters from a second plurality of parameters comprises calculate a state vector based on the parameters of the second subset.

In some embodiments of the device for identifying correct satellite signals to improve the accuracy of a satellite navigation system, determine a first subset of parameters from the first plurality of parameters corresponding to the plurality of satellite signals comprises: identify four parameters based on a single geographic location from the first plurality of parameters; and verify the state vector based on the parameters of the first subset with extrinsic information from one or more of an inertial measurement calculator, a clock, or a barometer.

In some embodiments of the device for identifying correct satellite signals to improve the accuracy of a satellite navigation system, determine a first subset of parameters from the first plurality of parameters corresponding to the plurality of satellite signals comprises: identify four parameters based on a single geographic location from the first plurality of parameters; and verify the state vector based on the parameters of the first subset with a fifth measurement from the first plurality of parameters.

In some embodiments of the device for identifying correct satellite signals to improve the accuracy of a satellite navigation system, the first plurality of parameters comprises one or more of pseudo-range or pseudo-range-rate parameters.

In some embodiments of the device for identifying correct satellite signals to improve the accuracy of a satellite navigation system, the first geographic location and the second geographic location each comprise one of a correct geographic location, a spoofed geographic location, or a faulted geographic location.

In some embodiments of the device for identifying correct satellite signals to improve the accuracy of a satellite navigation system, the device comprises: from a third plurality of parameters, the third plurality of parameters outside the first subset of parameters and the second subset of parameters: identify a fourth subset of parameters, wherein the fourth subset of parameters is based on two or more geographic locations.

In some embodiments of the device for identifying correct satellite signals to improve the accuracy of a satellite navigation system, identify an exemplary subset from the first subset and the second subset based on the a contrario score and KL divergence score for the first subset and the second subset comprises: identify the exemplary subset from the first subset and the second subset, the exemplary subset having a lowest a contrario score and a highest KL divergence score; and identify one or more consensus inlier parameters from the first plurality of parameters based on the exemplary subset having the lowest a contrario score and the highest KL divergence score.

In some embodiments of the device for identifying correct satellite signals to improve the accuracy of a satellite navigation system, identify an exemplary subset from the first subset and the second subset based on the a contrario score and KL divergence score for the first subset and the second subset comprises identify consensus inlier parameters from the first plurality of parameters, wherein the exemplary subset and the consensus inlier parameters comprise parameters corresponding to correct satellite signals.

In some embodiments of the device for identifying correct satellite signals to improve the accuracy of a satellite navigation system, calculate an a contrario score for one or more parameters of the first plurality of parameters outside the first subset comprises generate a chi-squared distribution based upon error measurements between the one or more parameters of the first plurality of parameters outside the first subset and predicted parameters based on the state vector corresponding to the first subset.

In some embodiments of the device for identifying correct satellite signals to improve the accuracy of a satellite navigation system, the KL divergence score for one or more parameters of the first plurality of parameters outside the first subset is based on a distribution of the one or more parameters of the first plurality of parameters outside the first subset and a distribution of predicted parameters based on the state vector corresponding to the first subset.

BRIEF DESCRIPTION OF THE DRAWINGS

The invention will now be described, by way of example only, with reference to the accompanying drawings, in which.

DETAILED DESCRIPTION OF THE INVENTION

Figure 1:
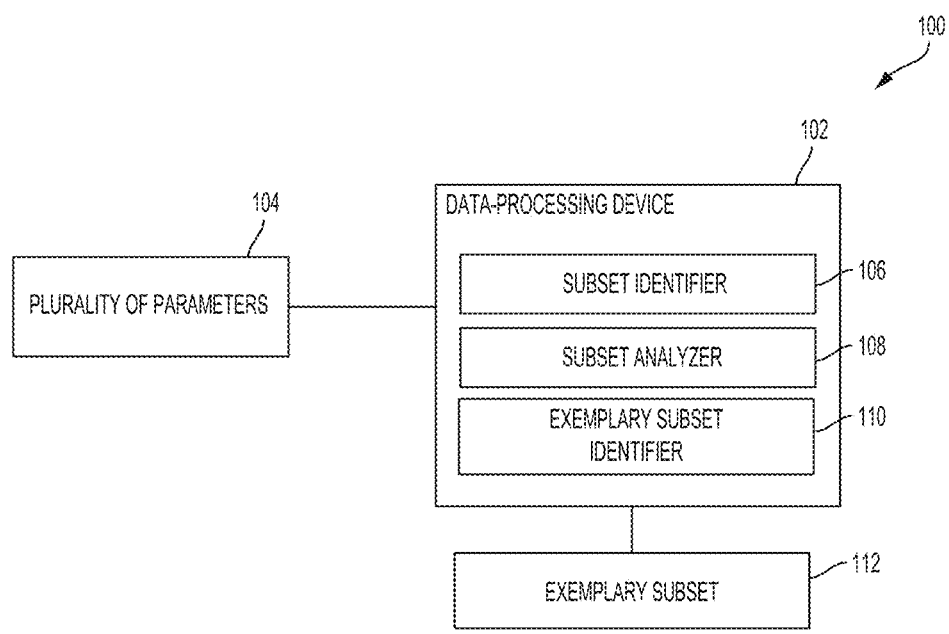
FIG. 1 illustrates a system for identifying correct satellite signals, according to some embodiments.

Described are exemplary embodiments of systems, methods, and techniques for identifying and partitioning illegitimate satellite signals from legitimate satellite signals for a satellite navigation system. As described above, the accuracy of a satellite navigation system depends upon the legitimacy of the satellite signal data the system is based upon. Thus, if spoofed signals, fault signals, and/or any other illegitimate satellite signals are used, the accuracy of the satellite navigation system is adversely affected. Embodiments provided herein can identify and partition these spoofed signals, fault signals, and/or any other illegitimate satellite signals from legitimate satellite signals to improve the accuracy of a satellite navigation system.

According to embodiments provided, an a contrario approach to processing the satellite data can be used to identify consistent satellite parameter data. An a contrario approach to analyzing data identifies inlier parameters as opposed to identifying outliers. Thus, an a contrario approach identifies the "best" data as the "least incorrect" data.

As used herein, the term "illegitimate" as used to describe a signal, a parameter, data, etc. refers to spoofed signals and/or satellite parameters corresponding to spoofed signals, faulty signals and/or satellite parameters corresponding to faulty signals, and any other signals, parameters, and data that may adversely affect the accuracy of a satellite navigation system. Conversely, the term "legitimate" is used to describe line-of-sight and/or a multi-path satellite signals and/or parameters corresponding to line-of-sight and/or a multi-path satellite signals that can be used to improve the accuracy of a satellite navigation system.

Generally, methods for identifying correct satellite signals to improve the accuracy of a satellite navigation system according to embodiments described herein may include: (1) receiving a plurality of satellite signals; (2) demodulating the plurality of satellite signals to form a first plurality of parameters corresponding to the plurality of satellite signals; (3) determining a first subset of parameters from the first plurality of parameters corresponding to the plurality of satellite signals, wherein the first subset of parameters is based on a first geographic location, comprising: (a) calculating an a contrario score for one or more parameters of the first plurality of parameters outside the first subset; (b) calculating a KL divergence score for one or more parameters of the first plurality of parameters outside the first subset; and (c) identifying, based on the a contrario score and the KL divergence score, one or more inlier parameters from one or more parameters of the first plurality of parameters outside the first subset; and (4) determining a second subset of parameters from a second plurality of parameters outside the first subset, the second plurality of parameters comprising one or more parameters of the first plurality of parameters outside the first subset, wherein the second subset of parameters is based on a second geographic location, comprising: (a) calculating an a contrario score for one or more parameters of the second plurality of parameters outside the second subset; (a) calculating a KL divergence score for one or more parameters of the second plurality of parameters outside the second subset; and (b) identifying, based on the a contrario score and the KL divergence score, one or more inlier parameters of the second plurality of parameters; and (5) identifying an exemplary subset from the first subset and the second subset based on the a contrario score and KL divergence score for the first subset and the second subset, wherein the exemplary subset comprises parameters corresponding to correct satellite signals. Each of these features will be described in turn below.

Receiving a Plurality of Satellite Signals & Demodulating the Plurality of Satellite Signals to Form a First Plurality of Parameters Corresponding to the Plurality of Satellite Signals FIG. 1 illustrates a system 100 for identifying and partitioning illegitimate signals from legitimate signals. System 100 includes plurality of parameters 104, a data-processing device 102, and exemplary subset 112.

Plurality of parameters 104 may be obtained from a plurality of satellite signals. For example, a receiver can receive a plurality of satellite signals, wherein the each satellite signal of the plurality of satellite signals includes data about its position and the current time. For example, the satellite signals may be from one or more satellites of a satellite constellation that provides positioning, navigation, and timing (PNT) services on a global or regional basis. The plurality of satellite signals may be received from satellites of a global navigation satellite system (GNSS) including the Global Positioning System (GPS), BeiDou Navigation Satellite System (BDS), Galileo, Globalnaya Navigazionnaya Sputnikovaya Sistema (GLONASS), the Indian Regional Navigation Satellite System (IRNSS), or other suitable GNSS systems.

Satellite signals may be in the form of radio signals (i.e., electromagnetic energy). At a given time, a satellite may begin transmitting a digital pattern (i.e., a pseudo-random code), and a receiver may begin transmitting the same digital pattern. When the satellite signal reaches the receiver, its transmission of the digital pattern will lag a bit behind the receiver's playing of the pattern. This lag, or delay, is the signal's travel time. The signal's travel time multiplied by the speed of light is the distance that the signal travelled. The receiver may account for propagation delays, or decreases in the signal's speed caused by the ionosphere and troposphere. Having information about the ranges (i.e., distance) to three satellites and the location of a satellite when the satellite's signal was sent, a receiver can calculate its own position. In some embodiments, a receiver may use signals from four different satellites to determine latitude, longitude, altitude, and time.

In some embodiments, plurality of parameters 104 includes pseudo-range parameters or pseudo-range and pseudo-range-rate parameters. A pseudo-range parameter is the pseudo distance between a satellite and a receiver. This parameter can be calculated by multiplying the speed of light by the amount of time the signal has taken from the satellite to the receiver. A pseudo-range-rate parameter represents the speed at which a range (i.e., distance) is changing between a satellite and a receiver.

Plurality of parameters 104 may include scalar pseudo-range parameters or two-component vectors including pseudo-range and pseudo-range-rate parameters. In some embodiments, four or more parameters of the plurality of parameters are consistent with a geographic location. For example, a geographic location may be an accurate location, a spoofed location, or a fault location. In some embodiments, one or more parameters are not consistent with a single geographic location.

Demodulating the plurality of satellite signals generates plurality of parameters 104 corresponding to the plurality of parameters. As mentioned above, plurality of parameters 104 may include data relating to a receiver and/or a satellite, such as receiver position, and velocity, receive time, satellite ephemeris data, receiver and satellite clock biases, and/or ionospheric and tropospheric correction factors. This data may be used to calculate pseudo-ranges and/or pseudo-range-rates corresponding to the plurality of satellites, described below.

For example, pseudo-range and pseudo-range-rates may be determined as described:

Knowing a satellite transmit time on a system clock ($t_{st,a}^t$) and satellite transmit time on a satellite clock ($\tilde{t}_{st,a}^t$), a transmitter clock bias may be determined:

$$\delta t_c^t = \tilde{t}_{st,a}^t - t_{st,a}^t$$

Similarly, knowing a receiver receive time on a system clock ($t_{sa,a}^t$) and a receiver receive time on a satellite clock ($\tilde{t}_{sa,a}^t$), a receiver clock bias can be calculated:

$$\delta t_c^a = \tilde{t}_{sa,a}^t - t_{sa,a}^t$$

Letting A, D, C, and $\omega_c$ represent the signal amplitude, data message, code sequence, and carrier frequency, respectively, a GNSS signal from satellite s may be defined as:

$$\psi_s(\tilde{t}_{sa,a}^s) = A_s \cdot D_s(\tilde{t}_{sa,a}^s - \tau_{sa}(\tilde{t}_{sa,a}^s)) \cdot C_s(\tilde{t}_{sa,a}^s - \tau_{sa}(\tilde{t}_{sa,a}^s)) \cdot e^{j(\omega_c \tilde{t}_{sa,a}^s - \varnothing_s(\tilde{t}_{sa,a}^s))}$$

A code delay ($\tau_{sa}(\tilde{t}_{sa,a}^s)$) is related to pseudo-range ($\rho_{a,R}^s$):

$$\tau_{sa}(\tilde{t}_{sa,a}^s) = \frac{\rho_{a,R}^s(\tilde{t}_{sa,a}^s)}{c},$$

and a Doppler shift ($\dot{\varnothing}_s(\tilde{t}_{sa,a}^s)$) is related to a pseudo-range-rate ($\dot{\rho}_{a,R}^s$):

$$\dot{\varnothing}_s(\tilde{t}_{sa,a}^s) = \frac{\omega_c}{c} \cdot (\dot{\rho}_{a,R}^s(\tilde{t}_{sa,a}^s)).$$

Accordingly, a receive-transmit delay and Doppler shift consistent with a given receive-antenna path and clock offset for a given satellite ephemeris can be calculated:

Where $\rho_{a,R}^s = c(\tilde{t}_{sa,a}^s) - \tilde{t}_{st,a}^t)$;

Satellite-receiver range and pseudo-range are related by:

$$r_{as}(t_{sa,a}^s) = \|r_{is}^j(t_{st,a}^s) - r_{ia}^j(t_{sa,a}^s)\|$$
$$= c(\tilde{t}_{sa,a}^t - \tilde{t}_{st,a}^s - \delta t_c^a + \delta t_c^s) - \delta \rho_{I,a} - \delta \rho_{T,a}^s$$
$$= \rho_{a,R}^s - c(\delta t_c^a + \delta t_c^s) - \delta \rho_{I,a}^s - \delta \rho_{T,a}^s$$

Thus, $\rho_{a,R}^s = r_{as} + c(\delta t_c^a - \delta t_c^s) + \delta \rho_{I,a}^{s,l} - \delta \rho_{T,a}^s$ And $\dot{\rho}_{a,R}^s = (\dot{r}_{as} + c(\delta \dot{t}_c^a - \delta \dot{t}_c^s))$ Where a satellite-receiver range is calculated in ECI (earth-centered inertial) coordinates aligned with ECEF (earth-centered, earth-fixed) coordinates at a time of signal reception, then:

$$r_{ia}^a(t_{sa}^s) = r_{ea}^a(t_{st,a}^s); \text{ and}$$

$$r_{is}^i(t_{st,a}^s) = C_e^i(t_{st}^s) r_{es}^e(t_{st,a}^s)$$

Where $C_e^i(t) = \begin{pmatrix} \cos\omega_{ie}(t - t_{sa}^s) & -\sin\omega_{ie}(t - t_{sa}^s) & 0 \\ \sin\omega_{ie}(t - t_{sa}^s) & \cos\omega_{ie}(t - t_{sa}^s) & 0 \\ 0 & 0 & 1 \end{pmatrix}$ And $C_e^i(t_{st}^s) \approx \begin{pmatrix} 1 & -\omega_{ie}(t_{st,a}^s - t_{sa}^s) & 0 \\ \omega_{ie}(t_{st,a}^s - t_{sa}^s) & 1 & 0 \\ 0 & 0 & 1 \end{pmatrix}.$ A position of the satellite in ECEF coordinates ($r_{as}(t_{sa,a}^s)$) can be calculated from the satellite ephemeris, taking into account reference time of the ephemeris ($t_{0e}$), mean anomaly of reference time (M), eccentricity of orbit, square root of a semi-major axis, right ascension of an ascending node of an orbital plane at a weekly epoch ($\Omega_0$), inclination angle at a reference time, and argument of perigee ($\omega$), wherein a weekly epoch is the time $T_0(t=0)$.

The position and velocity of a given satellite at a particular time can be calculated using any suitable ephemeris informational and/or ephemeris orbital software. Suitable software may be chosen by one having ordinary skill in the art.

Where a time of transmission ($t_{st,a}^t$) is:

$$0 = \|r_{is}^i(t) - r_{ia}^i(t_{sa,a}^t)\| - c(t - t_{st,a}^t) + \delta\rho_{I,a}^s + \delta\rho_{T,a}^s;$$

from which a position of a satellite at a time of transmission, the pseudo-range, and the pseudo-range-rate may be obtained.

Range and range-rate equations can be obtained from the satellite-receiver relative position and velocity:

$$v(t_{st,a}) = r_{is}^j(t) - r_{ia}^j(t_{sa,a}); \text{ and}$$

$$u(t_{st,a}) = \frac{v(t_{st,a})}{\|v(t_{st,a})\|}.$$

Then $r_{as}(t_{sa,a}^s) = \|v(t_{st,a})\|$;

And $\dot{r}_{as}(t_{sa,a}^s) = \dot{v}(t_{sa,a}^s) \cdot u(t_{st,a}).$

Finally, pseudo-range and pseudo-range-rate can be obtained by combining the following equations:

$$\rho_{a,R}^s = r_{as} + c(\delta t_c^a - \delta t_c^s) + \delta\rho_{I,a}^{s,l} - \delta\rho_{T,a}^s;$$

$$\dot{\rho}_{a,R}^s = (\dot{r}_{as} + c(\delta \dot{t}_c^a - \delta \dot{t}_c^s))$$

$$r_{as}(t_{sa,a}^s) = \|v(t_{st,a})\|$$

$$\dot{r}_{as}(t_{sa,a}^s) = \dot{v}(t_{sa,a}^s) \cdot u(t_{st,a}).$$

Determining a Subset of Parameters from the Plurality of Parameters Based on a Geographic Location Comprising: (A) Calculating an a Contrario Score; (B) Calculating a KL Divergence Score; and (C) Identifying, Based on the a Contrario Score and the KL Divergence Score, One or More Inlier Parameters In some embodiments, data-processing device 102 can be configured to identify plurality of parameters 104 to obtain a subset of parameters (e.g., using subset identifier 106). In some embodiments, subset identifier 106 may be configured to recursively identify plurality of parameters 104 by identifying a plurality of subsets of four parameters from the plurality of parameters of plurality of parameters 104. The four or more parameters of an identified subset may be consistent with a geographic location. In some embodiments, the geographic location may be an actual receiver location or a spoofed receiver location.

"Consistent" parameters or a "consistent" subset may refer to different types of consistency depending upon the parameters used. For example, geographic consistency may be achieved when pseudo-ranges are consistent with a given receiver position, clock-bias, and error model. Kinematic consistency may be achieved when pseudo-range and pseudo-range-rate errors are consistent with a given receiver position, velocity, clock-bias, clock-drift, and error model. Spatial consistency may refer to either geographic or kinematic consistency, depending upon the context.

Subset identifier 106 may be configured to search and identify plurality of parameters 104 until a predetermined criterion is satisfied. For example, subsets may be identified from plurality of parameters 104 until a predetermined probability of drawing at least one consistent subset is exceeded. In some embodiments, subsets may be identified from plurality of parameters 104 until threshold tests on the KL divergence score and the a contrario scores are satisfied.

In some embodiments, subset identifier 106 may be configured to perform weighted identifying, unweighted identifying, or a combination of weighted and unweighted identifying to obtain one or more subsets from plurality of parameters 104. For example, if subset identifier 106 is configured to perform weighted identifying, a state vector may be estimated from a subset comprising at least four parameters identified from plurality of parameters 104. In some embodiments, if subset identifier 106 is configured to perform unweighted identifying, a fifth parameter may be required to validate the state vector estimated from the subset comprising the first four parameters. In some embodiments, weighted identifying may be used to identify plurality of parameters 104 for one or more subsets. When using weighted identifying, only four parameters are necessary to form a subset, and extrinsic data may be used to validate the state vector estimated from the subset (i.e., an inertial parameter calculator, a clock, a barometer, etc.) instead of a fifth parameter as required in the unweighted identifying described above.

In some embodiments, a subset of four parameters may be used to identify a state vector, as mentioned above. In particular, data-processing device 102 may be configured to analyze each subset of the plurality of subsets (e.g., using subset analyzer 108) to calculate a state vector based on the subset.

A state vector x may be estimated using a non-linear least square method such as Levenberq-Marquardt, Newton Gauss, or weighted least squares. For example:

$$\hat{x}_{l,A} = \arg\left(\min\left(\sum_{i \in A} (\delta_{i,l}^2(x, t))\right)\right);$$

Where $\hat{x}_{l,A}$ is the non-linear least squares estimate for l=1, 2, A ⊂ 1, where I is a plurality of parameters. $Z_{1,A} = \{z_i | i \in A\}$, and $Z_{2,A} = Z_{1,A} \cup \{\dot{z}_{n+i} | i \in A\}$. If the cardinality of A is four, then A is a subset for estimating a state variable of a state vector.

In some embodiments, subset identifier 106 may include partitioning plurality of parameters 104 into one or more subsets each consistent with a corresponding state vector and one or more parameter prediction errors. A parameter prediction error $z_i$ may be consistent with a state vector, x, if the parameter prediction error is consistent with an error model according to some criteria (described in detail below). A subset of parameters is said to focus if the parameters of the subset are consistent with the same state vector.

A partitioned subset may have the following form:

$$Z = \{z_1, \ldots, z_n\} = \cup_{j=0}^{r} I_j \cup R_0;$$

Where r≥0; $I_0$, possibly empty, is the subset of parameters that are consistent with the receiver state vector; $\forall\ 1 \leq j \leq r\ \exists$ a state vector $x_j$ s.t. $z_k \in I_j \Leftrightarrow z_k \sim x_j$; if $I_0 \neq 0$, then $\|I_0\| \geq 5$; $\|I_j\| \geq 5$ for $1 \leq j \leq r$; and no subset of $R_0$ of cardinality is greater than four focuses.

In some embodiments, once subset identifier 106 has identified a subset from plurality of parameters 104, the quality of the geometry may be evaluated by calculating a condition number of the measurement matrix. For example, a condition number may be calculated once subset identifier 106 has identified a subset from plurality of parameters 104. This condition number can be thresholded to exclude poor geometries.

(A) Calculating an a Contrario Score for One or More Parameters of the Plurality of Parameters Outside the Subset.

Once a state vector is estimated, subset analyzer 108 of data-processing device 102 may be configured to calculate an a contrario score for each subset. In particular, an a contrario score for each parameter of plurality of parameters 104 that is not within the subset can be calculated by subset analyzer 108. This a contrario score may be based upon the error between observed parameters (i.e., parameters of plurality of parameters 104) and predicted parameters for an estimated state vector (e.g., the state vector estimated for the subset, above).

In some embodiments, predicted pseudo-range and/or pseudo-range-rate parameters for an estimated state vector may be calculated using the methods described above for calculating pseudo-range and pseudo-range-rate parameters. In some embodiments, predicted pseudo-range and/or pseudo-range-rate parameters may be obtained using an error model. An error model that can be used to obtain predicted pseudo-range or pseudo-range and pseudo-range-rate parameters can generally be obtained from the filter used. For example, filters include a Kalman filter, a particle filter, or another suitable modelling technique for predicting/modelling pseudo-range or pseudo-range and pseudo-range-rate parameters.

To determine an a contrario score for each non-subset parameter (i.e., each parameter of plurality of parameters 104 outside the subset), subset analyzer 108 of data-processing device 102 may be configured to individually analyze one or more parameters remaining in plurality of parameters 104 once a subset is identified and removed from plurality of parameters 104. An a contrario score can be based upon the parameter error between predicted parameters and observed parameters (i.e., the remaining parameters in plurality of parameters 104 once a given subset is removed from plurality of parameters 104). For example, subset analyzer 108 can be configured to calculate a sum of the squared error of the prediction parameters versus the observed parameters (e.g., chi-squared scores). For example, subset analyzer 108 may calculate a sum of the squared LDE value for each of the remaining parameters of plurality of parameters 104. In some embodiments, the observed parameters may first be normalized by the standard deviation of the prediction error (e.g., when the parameters are geographically consistent).

Observed parameters may correspond with the remaining parameters of plurality of parameters 104 after a given subset is identified. In some embodiments, predicted parameters may be obtained by calculating pseudo-range and/or pseudo-range-rate parameters as discussed above. For example, for a given state vector x, predicted pseudo-range ($\rho_i(x,t)$) and predicted pseudo-range-rate ($\dot{\rho}_i(x, t)$) parameters for satellite i received at time t may be calculated as described above (reproduced below):

$$\rho_{a,R}^s = r_{as} + c(\delta t_c^a - \delta t_c^s) + \delta \rho_{I,a}^{s,l} - \delta \rho_{T,a}^{s,}$$

$$\dot{\rho}_{a,R}^s = (\dot{r}_{as} + c(\dot{\delta t}_c^a - \dot{\delta t}_c^s))$$

The normalized square prediction errors for l=1, 2 are then:

$$\delta_{i,1}^2(x, t) = \frac{(\rho_i(x, t) - z_i)^2}{\sigma_i^2}$$

$$\delta_{i,2}^2(x, t) = \frac{(\rho_i(x, t) - z_i)^2}{\sigma_i^2} + \frac{(\dot{\rho}_i(x, t) - z_{n+i})^2}{\sigma_{n+i}^2};$$

where $z_{n+i} = \dot{z}_i$.

In some embodiments, an a contrario score may be determined using the following equations, where l=1, 2. For each observed parameter (i.e., the remaining parameters of plurality of parameters 104 once a given subset is identified and removed), the parameter error for each remaining parameter in plurality of parameters 104 may be defined as:

$$\delta^2(l, A, i, t) = \delta_{i,l}^2(\hat{x}_{l,A}, t)$$

And for each $S \subset I \setminus A$:

$$\delta^2(l, A, S, t) = \Sigma_{j \in S} \delta^2(l, A, j, t).$$

Assuming a Gaussian distribution of the parameter error, $\delta^2(l, A, S, t)$ may have a chi-square distribution on $l \cdot |S|$ degrees of freedom. Let $F(\cdot, k)$ be the cumulative chi-squared distribution on k degrees of freedom, $\delta^2(l, A, i_1, t) \le \delta^2(l, A, i_2, t) \le \ldots \le \delta^2(l, A, i_{n-m}, t)$, and $I_j = \{i_1, \ldots, i_j\}$. Then:

$$\delta^2(\ell, A, I_j, t) = \sum_{k=1}^{j} \delta^2(\ell, A, i_k, t)$$

In some embodiments, $F(\delta^2(l, A, I_j, t), l \cdot |I_j|)$ is the probability that the sum of $|I_j|$ chi-squared random variables of l degrees of freedom is smaller than $\delta^2(l, A, I_j, t)$. The inlier index set for l and A at time t is:

$$J(\ell, A, t) = \arg\left(\min_j (F(\delta^2(\ell, A, I_j, t), \ell \cdot |I_j|))\right),$$

and the a contrario score for the subset A at time t is $$Y(l, A, t) = F(\delta^2(l, A, I_{J(l,A,t)}, t), l \cdot |I_{J(l,A,t)}|).$$

(B) Calculating a KL Divergence Score for One or More Parameters of the First Plurality of Parameters Outside the First Subset.

In some embodiments, subset analyzer 108 of data-processing device 102 may be configured to calculate a KL divergence score for one or more subsets. A KL divergence score analyzes the difference between a probability distribution and a uniform distribution of parameter errors. In some embodiments, subset analyzer 108 maybe configured to determine a KL divergence score in addition to an a contrario score (described above). In some embodiments, subset analyzer 108 may be configured to determine a KL divergence score in lieu of an a contrario score.

To calculate a KL divergence score D (f||g), subset analyzer 108 may be configured to define a probability distribution D (l, A, t), for a given subset A:

$$D(l, A, t) = \{\delta^2(l, A, i, t) | i \in I \setminus A\}.$$

Letting $f_{A,l,t}$ represent the probability distribution of D (l, A, t), if subset A includes state-consistent satellites, then the elements of D (l, A, t) that are based on satellites state-consistent with subset A have a chi-squared distribution on l degrees of freedom. The remaining elements of D (l, A, t) may be identified from a random process. For example, a random process may be defined according to the below:

Randomly select receiver state vectors $x_1$ and $x_2$ and randomly select satellite s. Letting $\rho(s, x_i, t)$ and $\dot{\rho}(s, x_i, t)$ represent predicted parameters (i.e., the predicted pseudo-state and pseudo-state range parameters corresponding to a state vector based on the subset, described above), where i=1, 2, the parameter errors may be defined as:

$$\delta_1^2 = \frac{(\rho(s, x_1, t) - \rho(s, x_2, t))^2}{\sigma_\rho^2} \text{ and}$$

$$\delta_2^2 = \frac{(\rho(s, x_1, t) - \rho(s, x_2, t))^2}{\sigma_\rho^2} + \frac{(\dot{\rho}(s, x_1, t) - \dot{\rho}(s, x_2, t))^2}{\sigma_{\dot{\rho}}^2},$$

where $\sigma_\rho$ and $\sigma_{\dot{\rho}}$ are standard deviations of the pseudo-range and pseudo-range-rate parameters, respectively.

Where $\varrho_\ell$ represents the distribution of $\delta_l^2$, the distribution of the data is a mixture of a chi-squared distribution on l degrees of freedom and $$\hat{f}(A, l, t)(x) = \omega_1(A) \cdot x^2(\cdot, l) + (1 - \omega_1(A)) \cdot \varrho_\ell,$$

where $\omega_1(A)$ is the fraction of residuals coming from sources consistent with the subset.

In some embodiments, the KL divergence D(f||g) between the probability distribution $f_{A,l,t}$ and the uniform distribution can be calculated by subset analyzer 108, where f and g are two probability density functions:

$$D(f \| g) = \int f(x) \log\left(\frac{f(x)}{g(x)}\right) dx.$$

(C) Identifying, Based on the a Contrario Score and/or the KL Divergence Score, One or More Inlier Parameters from One or More Parameters of the Plurality of Parameters Outside the First Subset.

In some embodiments, once an a contrario score and/or a KL divergence score are determined for a given subset A, described above, subset analyzer 108 of data-processing device 102 maybe configured to identify, based upon the a contrario score and/or KL divergence score, one or more a contrario inlier parameters consistent with subset A.

For example, identifying one or more a contrario inlier parameters consistent with subset A may include selecting non-subset parameters of plurality of parameters 104 (i.e., one or more parameters of the plurality of parameters outside the subset) that satisfy a threshold test based on the a contrario score and/or KL divergence score. Once the one or more a contrario inlier parameters are identified as consistent with subset A, the four parameters of subset A and its a contrario inlier parameters may be partitioned and removed from plurality of parameters 104. For example, the parameters forming a subset and its a contrario inlier parameters are removed from plurality of parameters 104 without replacement.

In some embodiments, data-processing device 102 may be configured to, once subset A and its a contrario inlier parameters are identified, partitioned, and removed from plurality of parameters 104, repeat the subset identifying, subset analyzing, and a contrario inlier parameter identifying processes described to identify a second subset. In some embodiments, this process may repeat recursively until a predetermined probability of drawing at least one consistent subset is exceeded. In some embodiments, this process may repeat recursively until threshold tests on the KL divergence score and the a contrario scores are satisfied.

Identifying an Exemplary Subset From a Plurality of Subsets, Wherein the Exemplary Subset Comprises Parameters Corresponding to Correct Satellite Signals In some embodiments, exemplary subset identifier 110 may be configured to identify, from a plurality of subsets, an exemplary subset. In some embodiments, an exemplary subset may be the "best" or most consistent subset from the plurality of subsets based upon one or more determinants (i.e., an a contrario score and/or a KL divergence score).

A plurality of subsets may be obtained from identifying, analyzing, and identifying a contrario inlier parameters of plurality of parameters 104 (e.g., using subset identifier 106 and subset analyzer 108 of date-processing device 102). Each subset of the plurality of subsets may include one or more determinants representative of a subset's consistency with a geographic location. For example, each subset of the plurality of subsets may include a corresponding a contrario score and/or a corresponding KL divergence score representing the difference between a probability distribution and a uniform distribution of parameter error between observed parameters and predicted parameters (as described above).

In some embodiments, identifying an exemplary subset may include identifying the subset having a lowest a contrario score and a highest KL divergence score. For example, a consistent subset may be identified using two discriminants defined as $\Delta(l, A, t)$ and $\gamma(l, A, t)$. A threshold $\propto$ may be defined, and then:

$$C(A, l, t, \propto) = \{A | \gamma(l, A, t) < \propto\}$$

Let $$\check{\gamma}(l, t) = \min(\{\gamma(l, A, t) | A \in C(A, l, t, \propto)\}) \text{ and}$$

$$\hat{\Delta}(l, t) = \max(\{\Delta(l, A, t) | A \in C(A, l, t, \propto)\}).$$

A metric d may be chosen on $R^2$. For example, a Euclidean norm may be chosen. A "best" subset may then be defined as $$A_{\ell,t}^{**} = \min_A \left( d((\Upsilon(\ell, A, t), \Delta(\ell, A, t)), (\check{\Upsilon}(\ell, t), \hat{\Delta}(\ell, t))) \right).$$

In some embodiments, identifying an exemplary subset may include identifying exemplary inlier parameters for a "best" subset (i.e., a subset having a high KL divergence score and a low a contrario score described above). Various threshold tests may be performed on one or more parameters of plurality of parameters 104 to identify exemplary inlier parameters. In some embodiments, exemplary inlier parameters may include a parameter error $\delta^2(l, A^{}, i, t)$ within the first mode of kernel density estimate $\hat{I}(A^{}, 1, t)$. In some embodiments, exemplary inlier parameters may be identified as parameters having parameter error $\delta^2(l, A^{**}, i, t) \leq \tau_1$, for a given threshold $\tau_1$. In some embodiments, exemplary inlier parameters may be identified as a largest subset of the set $I_{j0}$ satisfying 1 and 2, wherein given a threshold $\tau_2$, j0 is defined by:

$$j_0 = \max(\{j | \forall k \leq j, F(\delta^2(l, A, I_k, t), l \cdot |I_k|) \leq \tau_2\}).$$

In some embodiments, an exemplary subset can include the "best" or most consistent subset of a plurality of subsets and its exemplary inlier parameters. For example, exemplary subset of parameters may correspond to one or more correct or legitimate satellite signals. In some embodiments, the exemplary set can be stored. For example, the exemplary set may be stored and used by a PNT (position, navigation, and timing) calculator of a satellite navigation system to improve the accuracy of the satellite navigation system.

In some embodiments, data-processing device 102 can be implemented on one or more virtual machines, servers, hardware appliance, general-purpose computers, or a combination thereof. In some embodiments, data-processing device 102 can be communicatively coupled to a user client such as a mobile device or a personal laptop. In some embodiments, data-processing device 102 can be coupled to the client device via a network that includes a local area network (LAN), a wide area network (WAN), the Internet, a Wi-Fi network, a WiMAX network, a cellular network (e.g., 3G, 4G, 4G Long Term Evolution (LTE)), or a combination thereof. Further, the network may implement one or more wired and/or wireless standards or protocols.

Figure 2:
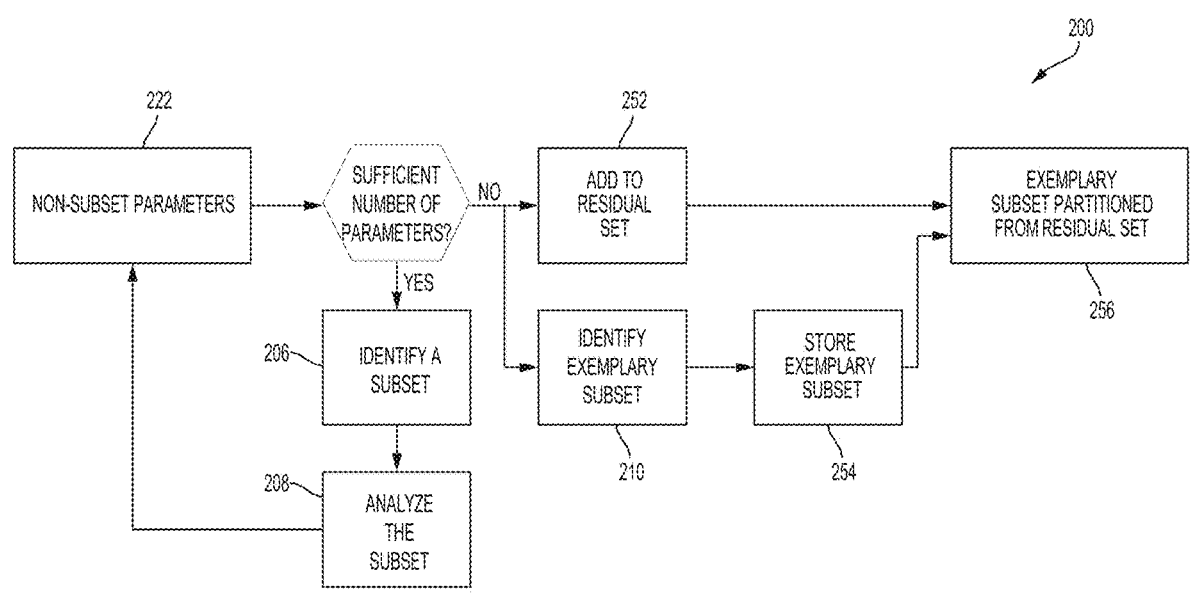
FIG. 2 illustrates a diagram demonstrating a process for identifying and identifying subsets of satellite parameters from a plurality of parameters and generating an exemplary subset, according to some embodiments.

FIG. 2 provides a diagram 200 for recursively identifying a plurality of subsets (e.g., using subset identifier 106 of FIG. 1) from non-subset parameters 222. In some embodiments, non-subset parameters 222 may comprise a plurality of parameters (e.g., plurality of parameters 104 of FIG. 1) corresponding to a plurality of satellite signals.

In some embodiments, one or more processors may be configured to implement the recursive process of diagram 200. For example, one or more processors may be configured to query non-subset parameters 222 to determine whether there are a sufficient number of parameters in non-subset parameters to identify a consistent subset.

If it is determined that there are a sufficient number of parameters in non-subset parameters 222 to identify a consistent subset, the one or more processors may be configured to identify a subset 206 and analyze the subset 208. In some embodiments, the one or more processors may be configured to identify a subset 206 according to subset identifier 106 of FIG. 1, described above. In some embodiments, one or more processors may be configured to analyze the subset 208 according to subset analyzer 108 of FIG. 1, described above.

In some embodiments, parameters of the subset may be removed from non-subset parameters 222 without replacement. The one or more processors may be configured to query non-subset parameters 222, identify a subset 206, and analyze the subset 208 so long as there are a sufficient number of parameters in non-subset parameters 222 to identify and analyze a consistent subset. In some embodiments, this recursive process may generate a plurality of subsets.

If it is determined that there are not a sufficient number of parameters in non-subset parameters 222 to identify a consistent subset, one or more parameters of non-subset parameters 222 may be added to a residual set 252. In some embodiments, a residual set may include parameters corresponding to one or more geographic location.

If it is determined that there are not a sufficient number of parameters in non-subset parameters 222 to identify a consistent subset, one or more processors may be configured to identify an exemplary subset 210 from a plurality of subsets generated using a recursive identifying and analyzing process described above. In some embodiments, one or more processors may be configured to identify an exemplary subset 210 according to exemplary subset identifier 210 of FIG. 1, described above. The exemplary subset may be stored in a memory coupled to the one or more processors.

In some embodiments, processes according to diagram 200 may result in an exemplary subset partitioned from a residual set 256. In some embodiments, exemplary subset of parameters may correspond to one or more correct or legitimate satellite signals. In some embodiments, the exemplary set may be stored and used by a PNT (position, navigation, and timing) calculator of a satellite navigation system to improve the accuracy of the satellite navigation system.

In some embodiments, once an exemplary subset partitioned from a residual set 256 is completed, a correction process step may be conducted. For example, a correction process step may be a feedback loop to identify if any parameters that may be present in one subset are better suited in another subset.

Figure 3:
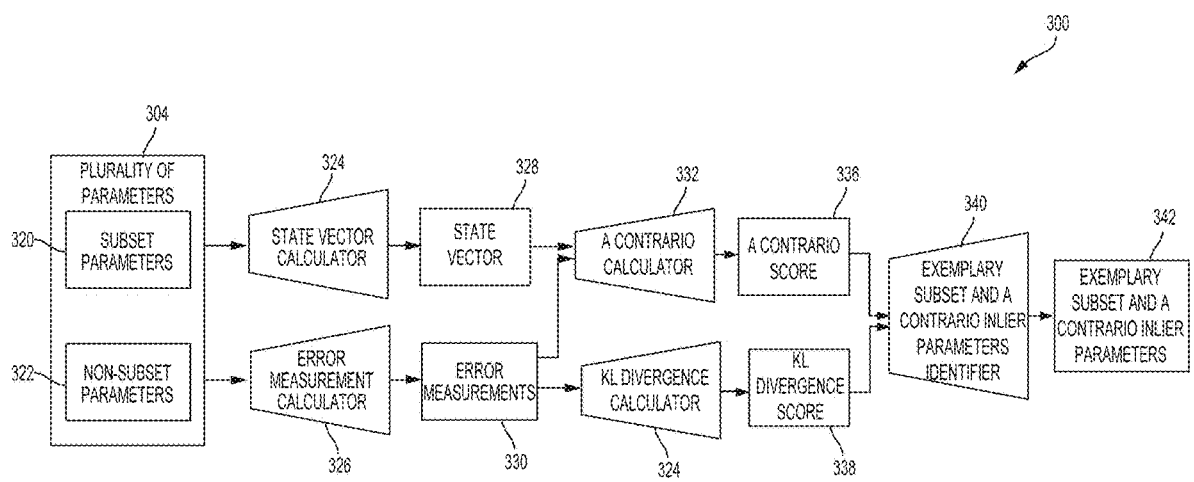
FIG. 3 illustrates a diagram showing how subsets of parameters may be identified using an a contrario score and/or a KL divergence score, according to some embodiments.

FIG. 3 shows a diagram 300 for identifying consistent subsets from plurality of parameters 304 according to some embodiments. A method for identifying subsets according to FIG. 3 can include, once four or more parameters have been identified from plurality of parameters 304 (i.e., using subset identifier 106 of FIG. 1), calculating a state vector consistent with the plurality of parameters (e.g., with state vector calculator 324), calculating error measurements for one or more non-subset parameter of plurality of parameters 304 (e.g., using error measurement calculator 326), determining an a contrario score for each of the one or more non-subset parameters of non-subset parameters 322 (e.g., using a contrario calculator 332), determining a KL divergence score for each of the one or more non-subset parameters of non-subset parameters 322 (e.g., using KL divergence calculator 334), and, based on and the plurality of a contrario scores 336 and KL divergence scores 338, determining an exemplary subset and its a contrario inlier parameters. Each of these features of diagram 300 is described in detail below.

Using the subset parameters 320 of plurality of parameters 304, state vector calculator 324 may be configured to calculate state vector 328 consistent with subset parameters 320. State vector 328 may be estimated from a subset (i.e., from subset parameters 320) comprising at least four parameters identified from plurality of parameters 304. In some embodiments, if the subset was identified using unweighted identifying, a fifth parameter may be required to validate the state vector estimated from the subset comprising the first four parameters. In some embodiments, weighted identifying may be used to identify plurality of parameters 304 for one or more subsets, in which only four parameters are necessary to determine and validate a state vector. For example, extrinsic data may be used to validate state vector 328 estimated from the subset (i.e., an inertial parameter calculator, a clock, a barometer, etc.) instead of a fifth parameter as required in the unweighted identifying described above. State vector 328 may be calculated using the methods described above with reference to subset analyzer 108 of FIG. 1.

In some embodiments, from the non-subset parameters 322, an error measurement calculator 326 may be configured to determine error measurements 330. In some embodiments, error measurements 330 can include at least one error measurement that corresponds to each of one or more parameters of non-subset parameters 322. In some embodiments, an error measurement of error measurements 330 may be a location discrepancy error (LDE), as described above with reference to subset analyzer 108 of FIG. 1.

In some embodiments, a contrario calculator 332 maybe configured to determine an a contrario score for one or more non-subset parameter of non-subset parameters 322. A contrario calculator may use, as inputs, state vector 328 based on a subset identified from subset parameters 320 and error measurements 330. In some embodiments, determining a contrario scores for a given subset may include calculating cumulative chi-squared scores as described above with reference to subset analyzer 108 of FIG. 1.

For example, a contrario score 336 may be based on a probability distribution of error measurements 330 and a uniform distribution of the error measurements 330. In some embodiments, a probability distribution of error measurements 330 can be determined by using kernel density estimation. Generally, kernel density estimation (KDE) is a non-parametric method to estimate the probability density function of a random variable. KDE operates by smoothing data when inferences about the data population can be made and the data is a finite data sample. Other suitable methods of determining a probability density function may also be utilized including a likelihood function or a probability mass function, for example.

In some embodiments, the distribution of the error measurements 330 can be approximated using a kernel density estimation as mentioned above. For example, a Gaussian kernel may be used, which is defined as:

$$\hat{f}(A, \ell, t)(x) = \frac{1}{h|I \setminus A|} \sum_{i \in I \setminus A} K\left(\frac{x - \delta^2(\ell, A, i, t)}{h}\right),$$

where K is the zero mean unit normal density, and h is the optimal bandwidth as defined in "Fast optimal bandwidth selection for kernel density estimation" by V. Raykar and R. Duraiswami and published in Proc. SIAM International Conference on Data Mining in 2006. Other suitable methods of defining the bandwidth may also be employed.

Using this kernel density estimation, U is the uniform distribution for:

$$\Delta(l, A, t) = D(\hat{f}(A, l, t) \| U).$$

Once a probability distribution and a uniform distribution of error measurements 330 have been determined, a contrario calculator 332 can calculate a contrario score 336 for each non-subset parameter of non-subset parameters 322.

In some embodiments, KL divergence calculator 334 maybe configured to determine a KL divergence score 338 for one or more parameters of non-subset parameters 322 based on error measurements 330 determined by error measurement calculator 326. For example, KL divergence score 338 may be determined as described above with reference to subset analyzer 108 of FIG. 1.

Once a contrario score 336 and/or KL divergence score 338 have been determined, a subset's a contrario inlier parameters may be identified (e.g., using a contrario inlier parameter identifier 340). In some embodiments, a contrario inlier parameter identifier 340 may identify one or more a contrario inlier parameters based on a subset by minimizing a cumulative test statistic. For example, one or more a contrario inlier parameters 342 may be defined as:

$$J(\ell, A, t) = \arg\left(\min_j(F(\delta^2(\ell, A, I_j, t), \ell \cdot |I_j|))\right).$$

In some embodiments, a contrario inlier parameters identifier 340 may be configured to determine one or more a contrario inlier parameters from plurality of parameters 304 based on a subset. In some embodiments, the number of parameters of plurality of parameters 304 may not be sufficient to identify more than one subset (e.g., using subset identifier 106 of FIG. 1). In some embodiments, the number of parameters of plurality of parameters 304 may not be sufficient to identify any consistent subsets at all (e.g., using subset identifier 106 of FIG. 1), in which case the parameters will all fall into a residual set, and the subset identifying and subset analyzing processes are concluded.

Figure 4:
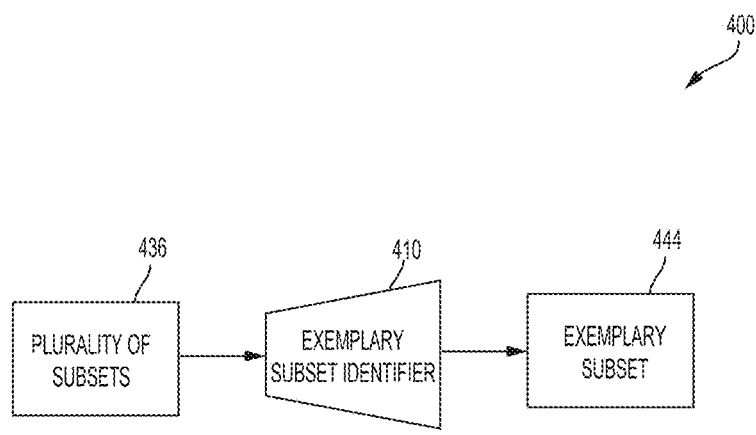
FIG. 4 illustrates a diagram showing how an exemplary subset may be identified, according to some embodiments.

FIG. 4 shows a diagram 400 for identifying an exemplary subset according to some embodiments. System 400 can include plurality of subsets 436, exemplary subset identifier 410, and exemplary subset 444.

Exemplary subset 444 may be result from the analysis of one or more subsets of plurality of subsets 436. For example, one or more subsets of plurality of subsets 436 may be analyzed according to subset analyzer 108 of FIG. 1.

For example, identifying an exemplary subset (i.e., with exemplary subset identifier 410) may include comparing a plurality of a contrario scores and a plurality of KL divergence scores corresponding to each of one or more subsets of plurality of subsets 436. For example, scatter plots depicted in FIGS. 20 and 21 depict one method of using a plurality of a contrario scores and a plurality of KL divergence scores to identify an exemplary subset.

In some embodiments, exemplary subset 444 may comprise the four or more parameters of the subset identified from plurality of subsets 436 and one or more exemplary inlier parameters identified using exemplary inlier identifier 446 (described below).

In some embodiments, exemplary subset identifier 444 maybe configured to determine one or more exemplary inlier parameters. For example, exemplary inlier identifier 444 may be configured to determine exemplary inlier parameters according to one or more of the methods described above in reference to exemplary subset identifier 110 of FIG. 1. For example, exemplary inlier identifier 444 may be configured to identify exemplary inlier parameters as parameters that include an error measurement $\delta^2(l, A^{}, i, t)$ within the first mode of kernel density estimate $\hat{f}(A^{}, l, t)$. In some embodiments, exemplary inlier identifier 446 may be configured to identify exemplary inlier parameters as parameters having an error measurement $\delta^2(l, A^{**}, i, t) \le \tau_1$, for a given threshold $\tau_1$. In some embodiments, exemplary inlier identifier 446 may be configured to identify the largest subset of the set $I_{j0}$ satisfying 1 and 2, wherein given a threshold $\tau_2$, j0 is defined by:

$$j_0 = \max(\{j \;|\forall k \le j, F(\delta^2(l, A, I_k, t), l \cdot |I_k|) \le \tau_2\}).$$

In some embodiments, exemplary subset 444 may comprise parameters corresponding to legitimate or correct satellite signals. In some embodiments, exemplary subset 444 can be stored (e.g., in storage 640 of computer 600 of FIG. 6). For example, exemplary subset 444 may be stored and sent to a PNT (position, navigation, and timing) calculator of a satellite navigation system to improve the accuracy of the satellite navigation system.

In some embodiments, once exemplary subset 444 is identified, a correction process step may be conducted. For example, a correction process step may be a feedback loop to identify if any parameters that may be present in one subset are better suited in another subset.

Figure 5:
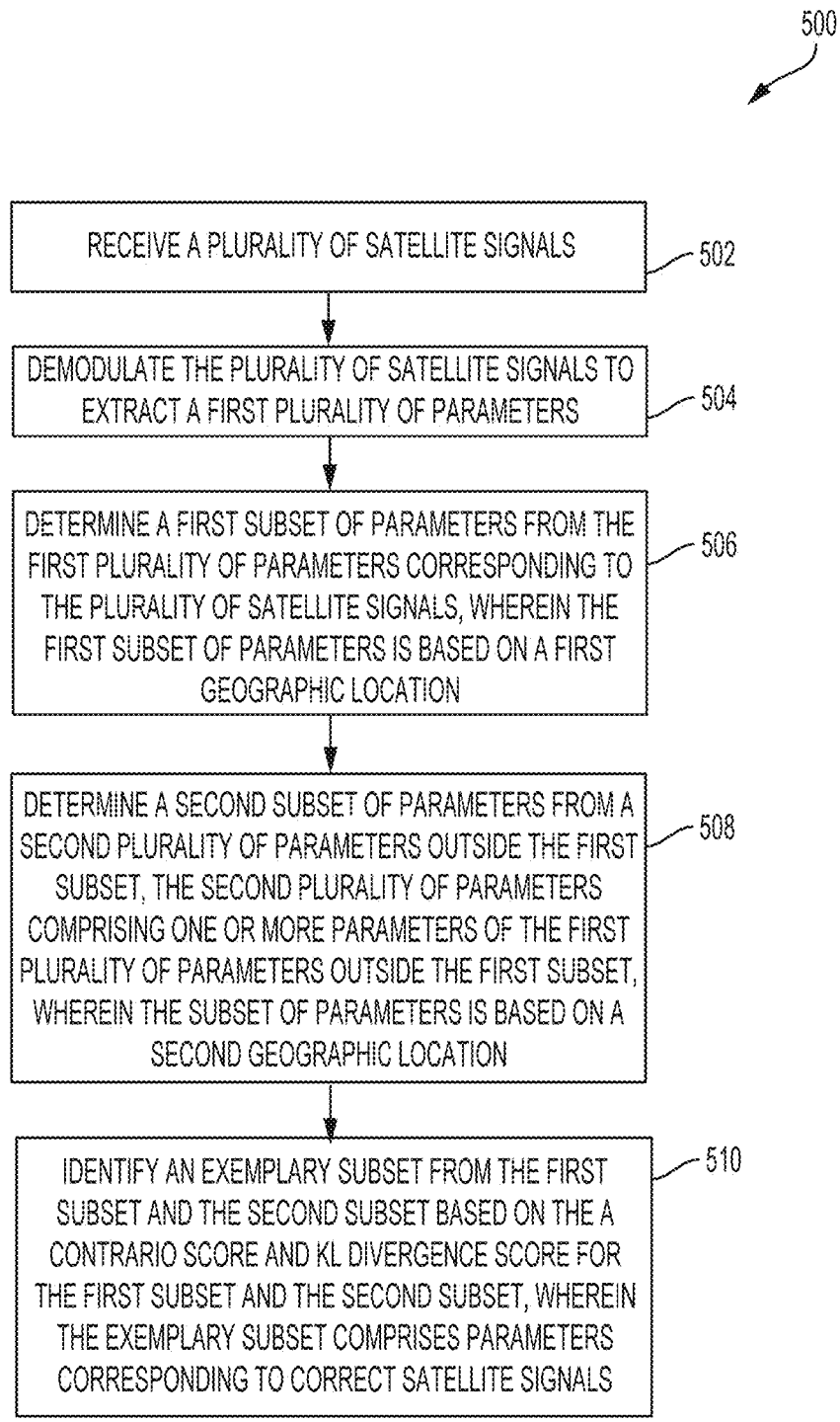
FIG. 5 illustrates a method for identifying subsets, identifying subsets, and identifying a subset, according to some embodiments.

FIG. 5 illustrates a flowchart of method 500 for identifying correct satellite signals from a plurality of satellite signals to improve the accuracy of a satellite navigation system. Method 500 can be performed by a data-processing device such as data-processing device 102 of FIG. 1.

Accordingly, one or more of the steps below may reference the components of data-processing device 102. Method 500 can be performed by processing logic that may comprise hardware (e.g., circuitry, dedicated logic, programmable logic, microcode, etc.), software (e.g., instructions running on a processing device), or a combination thereof.

In step 502, a receiver can receive a plurality of satellite signals, wherein the each satellite signal of the plurality of satellite signals includes data about its position and the current time. For example, the satellite signals may be from one or more satellites of a satellite constellation that provides positioning, navigation, and timing (PNT) services on a global or regional basis. The plurality of satellite signals may be received from satellites of a global navigation satellite system (GNSS) including the Global Positioning System (GPS), BeiDou Navigation Satellite System (BDS), Galileo, Globalnaya Navigazionnaya Sputnikovaya Sistema (GLONASS), the Indian Regional Navigation Satellite System (IRNSS), or other suitable GNSS systems.

Satellite signals may be in the form of radio signals (i.e., electromagnetic energy). At a given time, a satellite may begin transmitting a digital pattern (i.e., a pseudo-random code), and a receiver may begin transmitting the same digital pattern. When the satellite signal reaches the receiver, its transmission of the digital pattern will lag a bit behind the receiver's playing of the pattern. This lag, or delay, is the signal's travel time. The signal's travel time multiplied by the speed of light is the distance that the signal travelled. The receiver may account for propagation delays, or decreases in the signal's speed caused by the ionosphere and troposphere. Having information about the ranges (i.e., distance) to three satellites and the location of a satellite when the satellite's signal was sent, a receiver can calculate its own position. In some embodiments, a receiver may use signals from four different satellites to determine latitude, longitude, altitude, and time.

In step 504, the plurality of satellite signals may be demodulated to extract a first plurality of parameters. For example, a receiver configured to receive the plurality of satellite signals of step 502 may comprise a demodulator. The demodulator may be configured to extract a plurality of parameters as described generally above.

In step 506, a first subset of parameters may be determined from the first plurality of parameters corresponding to the plurality of satellite signals. In some embodiments, the first subset of parameters is based on a first geographic location. In some embodiments, the first subset of parameters may be determined according to diagram 300 of FIG. 3 and/or subset identifier 106 of FIG. 1. In some embodiments, the first subset may include four parameters consistent with a single geographic location (e.g., a receiver location, a spoofed receiver location, a fault receiver location, etc.). A state vector may be calculated based on the first subset parameters. In some embodiments, step 504 may include calculating an a contrario score and/or a KL divergence score for one or more non-subset parameters of the first plurality of parameters.

In step 508, a second subset of parameters may be determined from a second plurality of parameters outside the first subset. In some embodiments, the second plurality of parameters may include one or more parameter from the first plurality of parameters outside the first subset. In some embodiments, the second subset of parameters may be based on a second geographic location. In some embodiments, the second subset of parameters may be determined according to diagram 300 of FIG. 3 and/or subset identifier 106 of FIG. 1. In some embodiments, the second subset may include four parameters consistent with a single geographic location (e.g., a receiver location, a spoofed receiver location, a fault receiver location, etc.). A state vector may be calculated based on the second subset parameters. In some embodiments, step 504 may include calculating an a contrario score and/or a KL divergence score for one or more non-subset parameters of the second plurality of parameters.

In step 510, an exemplary subset may be identified from the first subset and the second subset. In some embodiments, step 510 may comprise identifying an exemplary subset based on one or more a contrario scores and/or KL divergence scores corresponding to the first subset and/or the second subset. In some embodiments, an exemplary subset may comprise correct satellite signals (i.e., line-of-sight and/or multipath satellite signals). In some embodiments, an exemplary subset may be stored and used by a PNT (position, navigation, and timing) calculator of a satellite navigation system to improve the accuracy of the satellite navigation system.

Figure 6:
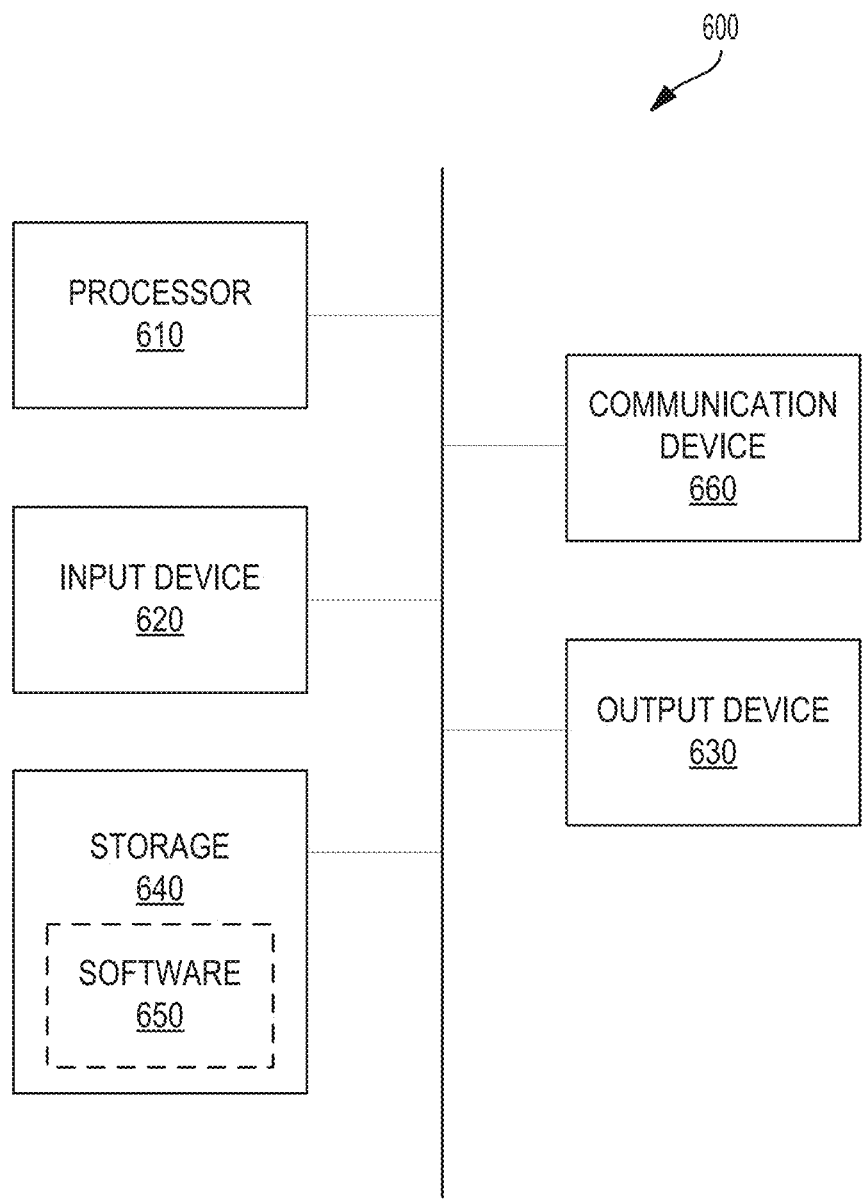
FIG. 6 illustrates an example of a computing device according to some embodiments.

FIG. 6 illustrates an example of a computer, according to some embodiments. Computer 600 can be a component of a system for identifying correct satellite signals from a plurality of satellite signals according to the systems and methods described above, or computer 600 can include the entire system itself. In some embodiments, computer 600 is configured to execute a method for identifying correct satellite signals from a plurality of satellite signals, such as method 500 of FIG. 5.

Computer 600 can be a host computer connected to a network. Computer 600 can be a client computer or a server. As shown in FIG. 6, computer 600 can be any suitable type of microprocessor-based device, such as a personal computer, workstation, server, or handheld computing device, such as a phone or tablet. The computer can include, for example, one or more of processor 610, input device 620, output device 630, storage 640, and communication device 660. Input device 620 and output device 630 can correspond to those described above and can either be connectable or integrated with the computer.

Input device 620 can be any suitable device that provides input, such as a touch screen or monitor, keyboard, mouse, or voice-recognition device. Output device 630 can be any suitable device that provides an output, such as a touch screen, monitor, printer, disk drive, or speaker.

Storage 640 can be any suitable device that provides storage, such as an electrical, magnetic, or optical memory, including a random access memory (RAM), cache, hard drive, CD-ROM drive, tape drive, or removable storage disk. Communication device 660 can include any suitable device capable of transmitting and receiving signals over a network, such as a network interface chip or card. The components of the computer can be connected in any suitable manner, such as via a physical bus or wirelessly. Storage 640 can be a non-transitory computer-readable storage medium comprising one or more programs, which, when executed by one or more processors, such as processor 610, cause the one or more processors to execute methods described herein, such as method 500 of FIG. 5.

Software 650, which can be stored in storage 640 and executed by processor 610, can include, for example, the programming that embodies the functionality of the present disclosure (e.g., as embodied in the systems, computers, servers, and/or devices as described above). In some embodiments, software 650 can include a combination of servers such as application servers and database servers.

Software 650 can also be stored and/or transported within any computer-readable storage medium for use by or in connection with an instruction execution system, apparatus, or device, such as those described above, that can fetch and execute instructions associated with the software from the instruction execution system, apparatus, or device. In the context of this disclosure, a computer-readable storage medium can be any medium, such as storage 640, that can contain or store programming for use by or in connection with an instruction execution system, apparatus, or device.

Software 650 can also be propagated within any transport medium for use by or in connection with an instruction execution system, apparatus, or device, such as those described above, that can fetch and execute instructions associated with the software from the instruction execution system, apparatus, or device. In the context of this disclosure, a transport medium can be any medium that can communicate, propagate, or transport programming for use by or in connection with an instruction execution system, apparatus, or device. The transport-readable medium can include but is not limited to, an electronic, magnetic, optical, electromagnetic, or infrared wired or wireless propagation medium.

Computer 600 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

Computer 600 can implement any operating system suitable for operating on the network. Software 650 can be written in any suitable programming language, such as C, C++, Java, or Python. In various embodiments, application software embodying the functionality of the present disclosure can be deployed in different configurations, such as in a client/server arrangement or through a Web browser as a Web-based application or Web service, for example.

EXAMPLES

Examples 1A-1E: The methods disclosed herein were tested using simulated satellite data obtained from NORAD (North American Aerospace Defense Command). The data included a GPS constellation having 31 satellites, 10 of which were visible, as provided in FIG. 7. The primary receiver location was located at 42.36° N and 71.07° W. A location of spoofed signals was offset from the primary receiver location by 25-1200 meters East (see Tables 1-5, below). A velocity of spoofed satellite signals was offset from the primary receiver velocity (0 m/s) by 0-8 m/s southwestward.

Figure 7:
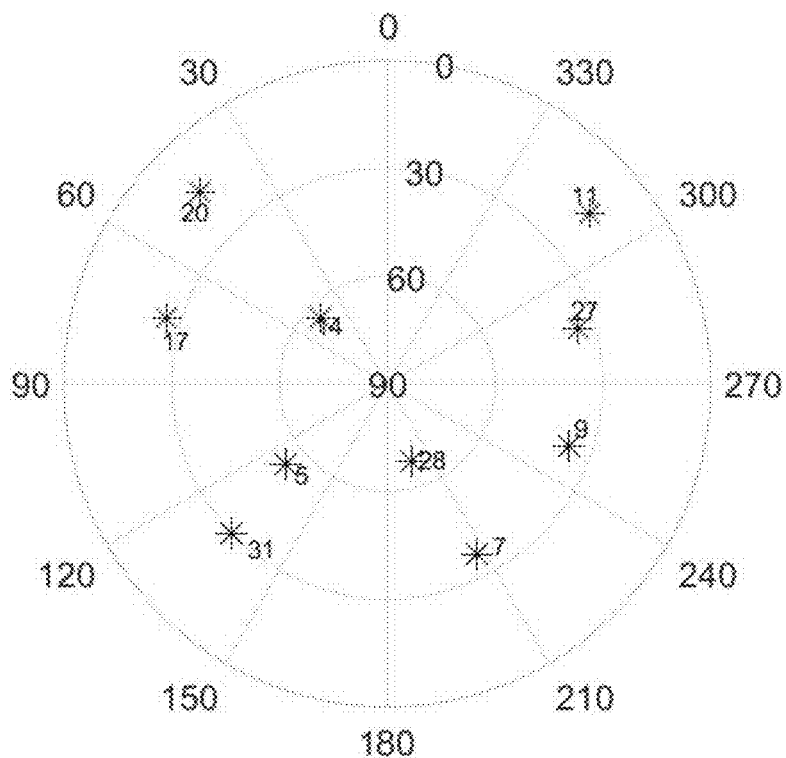
FIG. 7 illustrates a GPS constellation, according to some embodiments.

FIG. 7 provides azimuth and elevation angles of the 10 visible satellites according to the GPS constellation data. The odd-numbered satellite parameters were consistent with the primary receiver location, and the even-numbered satellites were consistent with a spoofed location. The visible satellites included satellites 5, 7, 9, 11, 14, 17, 20, 27, 28, and 31. Thus, there were seven (odd-numbered) satellites consistent with the true geographic location and three (even-numbered) satellites consistent with one or more spoof location. Accurate methods for identifying satellite signals consistent with the true location will select odd-numbered satellites for a consistent subset and odd-numbered satellites as a contrario inliers. There are only three (even-numbered) satellites consistent with one or more spoof locations, which is not enough to identify them as a consistent subset of satellites according to the methods provided herein. (At least five consistent satellites are required to identify a consistent subset). For each trial (i.e., for each pair of position and velocity offsets), the a contrario method employed identified 95 subsets. Tables 1-5, below, show the exemplary subset and exemplary inliers from the 95 identified subsets for each trial. At position offsets of 200 meters or less, methods used occasionally misidentify satellite 28 as being consistent with the true location, when it is in fact consistent with a spoof location. This may be due to the small difference in the satellite-to-receiver distances for this satellite. Accordingly, methods provided herein may be more accurate with increased satellite-to-receiver distances.

Example 1A

Methods disclosed were applied only to pseudo-range satellite data (i.e., a stationary receiver). The odd-numbered satellites were consistent with the stationary receiver location, and the even satellites were consistent with the spoofed receiver location. Table 1, below, provides the exemplary subset and inlier satellites identified for each of several satellite-to-receiver distances.

TABLE 1

Partitioning of GPS satellites for a stationary receiver (i.e., having a velocity offset equal to 0 m/s).

| Distance offset (m) | seed | Inliers |
| --- | --- | --- |
| 100 | 7, 11, 17, 28 | 5, 9, 27, 31 |
| 200 | 5, 7, 11, 31 | 9, 17, 27, 28 |
| 400 | 7, 9, 17, 27 | 5, 11, 31 |
| 800 | 5, 7, 17, 27 | 9, 11, 31 |
| 1200 | 5, 7, 11, 31 | 9, 17, 27 |

As shown in Table 1, a contrario methods described above were used to identify and analyze satellite data representing a stationary receiver and spoofed locations offset from the stationary receiver at distances of 100 m, 200 m, 400 m, 800 m, and 1200m. In all of the trials across the various separation distances, the odd-numbered satellites are consistent with the stationary receiver location and the even-numbered satellites are consistent with the spoofed receiver location.

In the first trial shown in Table 1 (i.e., separation of 100 m), an a contrario method described above was recursively applied to the data to identify 95 consistent subsets and their corresponding inliers. For example, the a contrario method applied to the data may be that depicted in FIG. 3. A first search of the data identified a first subset of parameters corresponding to satellites 7, 11, 17, and 28. The subset was analyzed, yielding parameters corresponding to satellites 5, 9, 27, and 31 as inlier parameters, for a total of eight parameters. These subset parameters and inlier parameters were removed from the ten parameters, leaving two parameters remaining. Because five or more parameters are required for a consistent subset (without the use of extrinsic data such as IMU, clock, or barometer information), the remaining two parameters were not sufficient to perform a second pass and identify a second subset.

Note that in this first trial, even-numbers satellite 28 was misidentified as being consistent with the true location along with the odd-numbered satellites. This is also the case for the second trial (having a satellite-to-receiver separation of 200 m), in which satellite 28 was misidentified as an a contrario inlier. However, for trials with satellite-to-receiver distances greater than 200 m, satellite 28 is not misidentified as consistent with a true location (and odd-numbered satellites). Accordingly, based on the data of Table 1, the accuracy of the method appears to improve as the spoofed location offset increases.

Example 1B

Methods disclosed were applied to both pseudo-range and pseudo-range-rate satellite data (i.e., a moving receiver). The odd-numbered satellites were consistent with a moving receiver location (receiver velocity offset=1 m/s), and the even satellites were consistent with a spoofed receiver location. Table 2, below, provides the exemplary subsets and inlier satellites identified with provided methods that correspond to various satellite-to-receiver distances.

TABLE 2

Partitioning of GPS satellites for a moving receiver having a velocity offset equal to 1 m/sec.

| Distance Offset (m) | Seed | Inlier |
| --- | --- | --- |
| 25 | 5, 7, 17, 27 | 9, 11, 28, 31 |
| 50 | 5, 17, 27, 31 | 7, 9, 11, 28 |
| 100 | 5, 7, 9, 11 | 17, 27, 31 |
| 200 | 11, 17, 27, 31 | 5, 7, 9, 28 |
| 400 | 5, 9, 11, 31 | 7, 17, 27 |
| 800 | 9, 17, 27, 31 | 5, 7, 11 |
| 1200 | 7, 11, 17, 31 | 5, 9, 27 |

Unlike the results of Example 1A, methods disclosed herein accurately identified consistent subset and inlier parameters for all satellite-to-receiver distances. Thus, the accuracy of methods provided, when applied to pseudo-range and pseudo-range-rate data, do not appear to be as sensitive to the separation between a moving receiver location and a spoofed receiver location.

Example 1C

Methods disclosed were applied to both pseudo-range and pseudo-range-rate satellite data (i.e., a moving receiver). The odd-numbered satellites were consistent with a moving receiver location (receiver velocity offset=2 m/s), and the even satellites were consistent with a spoofed receiver location. Table 3, below, provides the exemplary subsets and inlier satellites identified with provided methods that correspond to various satellite-to-receiver distances.

TABLE 3

Partitioning of GPS satellites for a moving receiver having a velocity offset equal to 2 m/sec.

| Distance Offset (m) | Seed | Inlier |
|---|---|---|
| 25 | 5, 17, 27, 31 | 7, 9, 11 |
| 50 | 5, 9, 11, 17 | 7, 27, 31 |
| 100 | 17, 27, 28, 31 | 7, 9 |
| 200 | 7, 5, 11, 31 | 9, 17, 27 |
| 400 | 5, 7, 17, 27 | 9, 11, 31 |
| 800 | 5, 7, 11, 27 | 9, 17, 31 |
| 1200 | 7, 11, 17, 31 | 5, 9, 27 |

Again, as seen in Example 1B, exemplary subsets and their inliers all include odd-numbered satellites, which are consistent with the true location.

Example 1D

Methods disclosed were applied to both pseudo-range and pseudo-range-rate satellite data for a moving receiver having a receiver velocity offset of 4 m/s. The odd-numbered satellites were consistent with this moving receiver location (receiver velocity offset=4 m/s), and the even satellites were consistent with a spoofed receiver location. Table 4, below, provides the exemplary subsets and inlier satellites identified with provided methods that correspond to various satellite-to-receiver distances.

TABLE 4

Partitioning of GPS satellites for a moving receiver having a velocity offset equal to 4 m/sec.

| Distance Offset (m) | Seed | Inlier |
|---|---|---|
| 25 | 5, 17, 27, 31 | 7, 9, 11 |
| 50 | 9, 11, 17, 31 | 5, 7, 27 |
| 100 | 5, 11, 17, 31 | 7, 9, 27 |
| 200 | 5, 7, 9, 17 | 11, 27, 31 |
| 400 | 5, 7, 27, 31 | 9, 11, 17 |
| 800 | 11, 17, 27, 31 | 5, 7, 9 |
| 1200 | 5, 7, 17, 27 | 9, 11, 31 |

Methods disclosed herein accurately identified exemplary subset and subset inliers that correspond to the true location.

Example 1E

Methods disclosed were applied to both pseudo-range and pseudo-range-rate satellite data for a moving receiver having a receiver velocity offset of 8 m/s. The odd-numbered satellites were consistent with a moving receiver location, and the even satellites were consistent with a spoofed receiver location. Table 5, below, provides the exemplary subsets and inlier satellites identified with provided methods that correspond to various satellite-to-receiver distances.

TABLE 5

Partitioning of GPS satellites for a moving receiver having a velocity offset equal to 8 m/sec.

| Distance Offset (m) | Seed | Inlier |
|---|---|---|
| 25 | 5, 17, 27, 31 | 7, 9, 11 |
| 50 | 5, 9, 11, 31 | 7, 17, 27 |
| 100 | 5, 7, 27, 31 | 9, 11, 17 |
| 200 | 5, 7, 11, 31 | 9, 17, 27 |
| 400 | 5, 7, 11, 17 | 9, 27, 31 |
| 800 | 5, 9, 17, 27 | 7, 11, 31 |
| 1200 | 5, 9, 17, 27 | 7, 11, 31 |

Again, methods disclosed herein accurately identified an exemplary subset and inlier subset satellites.

Examples 2A-E

Methods disclosed herein were tested using simulated satellite data obtained from NORAD (North American Aerospace Defense Command). The data included a GPS constellation and a Galileo constellation having 48 satellites total, 12 of which were visible, as provided in FIG. 8. Specifically, satellites 1-31 form a GPS constellation, and satellites 32-48 form a Galileo constellation. The primary receiver location was located at 42.36° N and 71.07° W. A location of spoofed signals was offset from the primary receiver location by 200-1200 meters East (see Tables 6-9, below). A velocity of spoofed signals was offset from the primary receiver velocity (0 m/s) by 0-8 m/s southwestward. The tables below show the partitioning achieved with the proposed method for velocity offsets of 1-8 m/sec and position offsets of 200-1200 m. Seventy-four subsets were required in the first pass to identify an exemplary subset. In examples where two inlier satellites were identified in the first pass, fifteen subsets were identified during the second pass.

Figure 8:
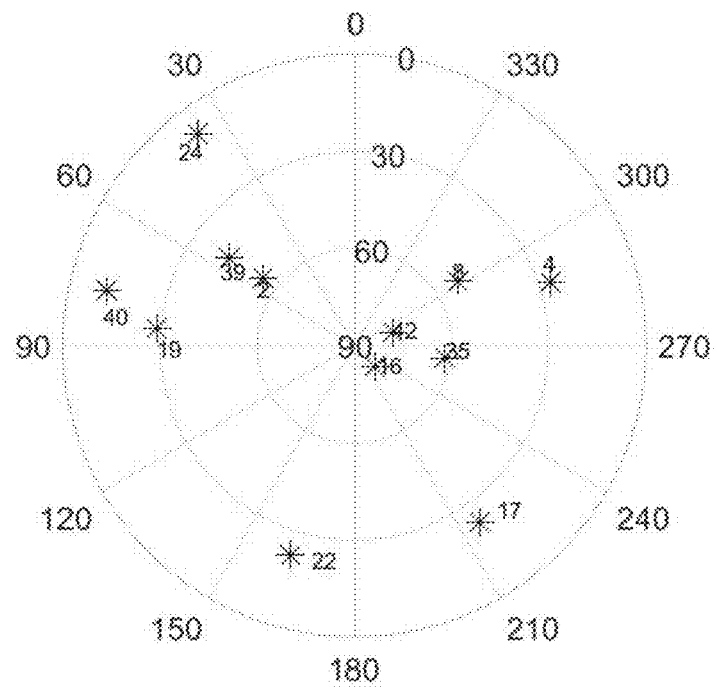
FIG. 8 illustrates a GPS constellation and a Galileo constellation, according to some embodiments.

FIG. 8 provides azimuth and elevation angles of the 12 visible satellites according to the GPS and Galileo constellation data. The visible satellites included satellites 2, 4, 8, 16, 17, 19, 22, 24, 35, 39, 40, and 42. Satellites 1-20 were consistent with the true receiver location, and satellites 21-48 were consistent with the spoofed signal location. Thus, the visible satellites consistent with the true location were 2, 4, 8, 16, 17, and 19, and the visible satellites consistent with the spoofed location were 22, 24, 35, 39, 40 and 42.

Example 2A

The methods disclosed were applied to pseudo-range and pseudo-range-rate satellite data (i.e., a moving receiver). The moving receiver of this example had a velocity offset of 1 m/s. Table 6, below, provides the exemplary subsets and inlier satellites identified for a first and second iterative pass of the satellite signal data for several different satellite-to-receiver distances.

TABLE 6

Partitioning of GPS and Galileo satellites for a moving
receiver having a velocity offset equal to 1 m/s.

| Distance Offset (m) | Pass 1 Seed | Pass 1 Inlier | Pass 2 Seed | Pass 2 Inlier |
|---|---|---|---|---|
| 200 | 2, 4, 17, 19 | 8, 16 | 24, 32, 35, 40 | 22, 39 |
| 400 | 2, 4, 16, 19 | 8, 17 | 22, 24, 39, 42 | 35, 40 |
| 800 | 2, 4, 17, 19 | 8, 16 | 24, 35, 39, 40 | 22, 42 |
| 1200 | 2, 4, 16, 17 | 8, 19 | 24, 39, 40, 42 | 22, 35 |

As shown in Table 6, a contrario methods described above were used to identify and analyze satellite data representing a moving receiver and spoofed locations offset from the stationary receiver at distances of 200 m, 400 m, 800 m, and 1200 m. In all of the trials across the various separation distances, the satellites consistent with the moving receiver location were satellites 2, 4, 8, 16, 17, and 19. Satellites 22, 24, 35, 39, 40, and 42 were consistent with the spoofed receiver location.

Example 2B

Methods disclosed were applied to pseudo-range and pseudo-range-rate satellite data for a moving receiver having a velocity offset equal to 2 m/s. As in Example 2A, satellites 2, 4, 8, 16, 17, and 19 were consistent with the moving receiver location, and satellites 22, 24, 35, 39, 40, and 42 were consistent with the spoofed receiver location. Table 7, below, provides the exemplary subsets and inlier satellites identified for a first and second iterative pass of the satellite signal data for several different satellite-to-receiver distances.

TABLE 7

Partitioning of GPS and Galileo satellites for a moving
receiver having a velocity offset equal to 2 m/s.

| Distance Offset (m) | Pass 1 Seed | Pass 1 Inlier | Pass 2 Seed | Pass 2 Inlier |
|---|---|---|---|---|
| 200 | 4, 16, 17, 24 | 8 | 22, 39, 40, 42 | 35 |
| 400 | 2, 4, 8, 16 | 17, 19 | 22, 35, 39, 42 | 24, 42 |
| 800 | 2, 4, 8, 16 | 17, 19 | 22, 24, 35, 42 | 39, 40 |
| 1200 | 2, 4, 8, 17 | 16, 19 | 22, 24, 39, 42 | 35, 40 |

As shown in Table 7, a contrario methods described above were used to identify and analyze satellite data representing a moving receiver and spoofed locations offset from the stationary receiver at distances of 200 m, 400 m, 800 m, and 1200 m.

Example 2C

Methods disclosed were applied to pseudo-range and pseudo-range-rate satellite data for a moving receiver having a velocity offset equal to 4 m/s. As discussed above, satellites 2, 4, 8, 16, 17, and 19 were consistent with the moving receiver location, and satellites 22, 24, 35, 39, 40, and 42 were consistent with the spoofed receiver location. Table 8, below, provides the exemplary subsets and inlier satellites identified for a first and second iterative pass of the satellite signal data for several different satellite-to-receiver distances.

TABLE 8

Partitioning of GPS and Galileo satellites for a moving
receiver having a velocity offset equal to 4 m/s.

| Distance Offset (m) | Pass 1 Seed | Pass 1 Inlier | Pass 2 Seed | Pass 2 Inlier |
|---|---|---|---|---|
| 200 | 16, 17, 40, 22 | 39 | 4, 8, 19, 42 | none |
| 400 | 22, 35, 39, 40 | 24, 42 | 8, 16, 17, 19, | 2, 4 |
| 800 | 4, 16, 17, 40 | none | 22, 24, 35, 39 | 42 |
| 1200 | 8, 16, 17, 19 | 2, 4 | 22, 24, 39, 40 | 35, 42 |

A contrario methods described above were used to identify and analyze satellite data representing a moving receiver and spoofed locations offset from the stationary receiver at distances of 200 m, 400 m, 800 m, and 1200 m.

Example 2D

Methods disclosed were applied to pseudo-range and pseudo-range-rate satellite data for a moving receiver having a velocity offset equal to 8 m/s. As discussed above, satellites 2, 4, 8, 16, 17, and 19 were consistent with the moving receiver location, and satellites 22, 24, 35, 39, 40, and 42 were consistent with the spoofed receiver location. Table 9, below, provides the exemplary subsets and inlier satellites identified for a first and second iterative pass of the satellite signal data for several different satellite-to-receiver distances.

TABLE 9

Partitioning of GPS and Galileo satellites for a moving
receiver having a velocity offset equal to 8 m/s.

| Distance Offset (m) | Pass 1 Seed | Pass 1 Inlier | Pass 2 Seed | Pass 2 Inlier |
|---|---|---|---|---|
| 200 | 24, 35, 39, 40 | 22, 42 | 2, 8, 17, 19 | 4, 16 |
| 400 | 2, 8, 16, 19 | 4, 17 | 22, 24, 35, 39 | 40, 42 |
| 800 | 2, 4, 17, 19 | 8, 16 | 22, 24, 35, 39 | 40, 42 |
| 1200 | 2, 4, 17, 19 | 8, 16 | 22, 24, 39, 42 | 35, 40 |

A contrario methods described above were used to identify and analyze satellite data representing a moving receiver and spoofed locations offset from the stationary receiver at distances of 200 m, 400 m, 800 m, and 1200 m.

Example 3

Figure 9:
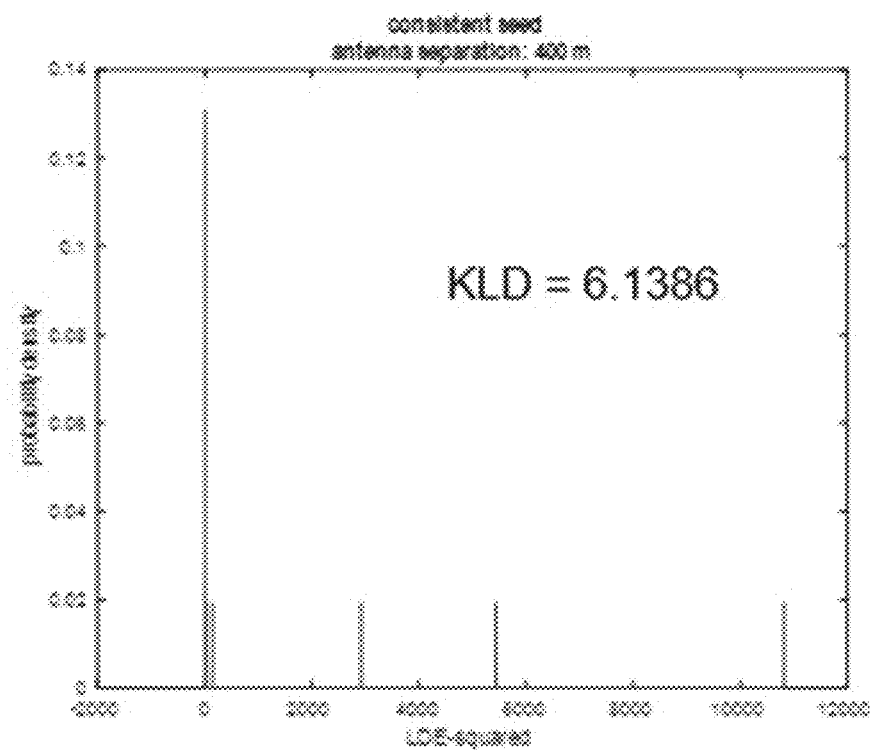
FIG. 9 illustrates determining a KL divergence score from a consistent subset of parameters, according to some embodiments.
Figure 10:
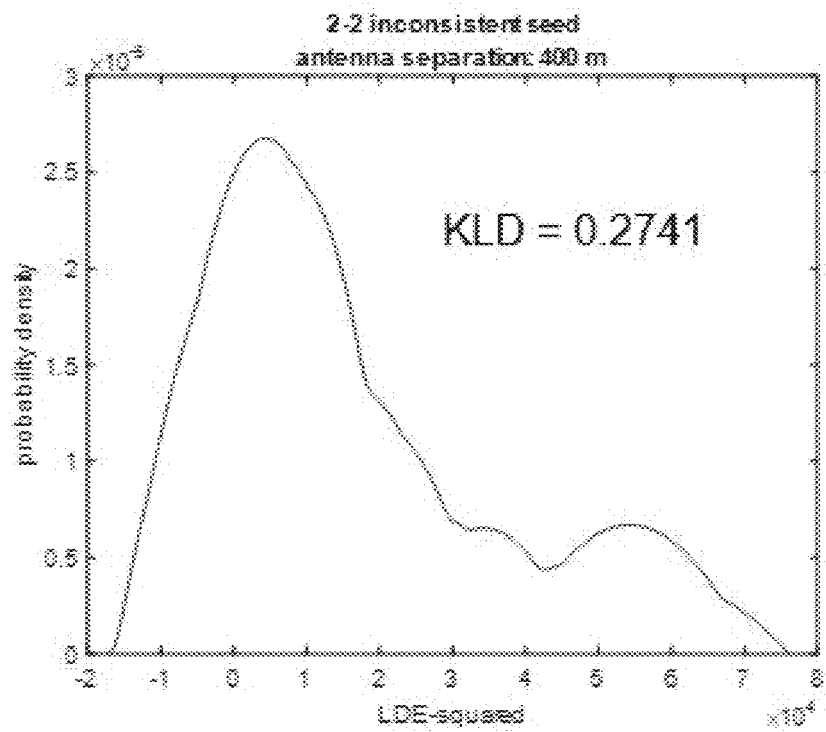
FIG. 10 illustrates determining a KL divergence score from an inconsistent subset of parameters, according to some embodiments.

Methods provided were used to calculate KL divergence scores for two sets of subsets—a first subset comprising consistent parameters (i.e., parameters corresponding to a single geographic location) and a second subset comprising inconsistent parameters (i.e., parameters inconsistent with a single geographic location). FIG. 9 depicts the KL divergence score for the first, consistent subset, and FIG. 10 depicts the KL divergence score for the second, inconsistent subset. Both figures provide the squared location discrepancy errors (LDE) corresponding to one or more parameters of a plurality of parameters outside the subset along the x-axis, and a probability density along the y-axis. In some embodiments, the probability density of the y-axis may be based on a kernel density estimation.

As shown in FIG. 9, the KL divergence score for the subset depicted is 6.1386. The KL divergence score, as shown, is calculated based on the probability estimation and squared LDE values according to methods described above.

As shown in FIG. 10, the KL divergence score for the subset depicted is 0.2741. The KL divergence score, as shown, is calculated based on the probability estimation and squared LDE values according to methods described above.

As explained, a subset comprising parameters corresponding to correct and/or legitimate satellite signals will have a KL divergence score that is greater than the KL divergence score of a subset comprising parameters corresponding to incorrect and/or illegitimate satellite signals. Accordingly, the KL divergence score of the subset comprising consistent parameters depicted in FIG. 9 is greater than that of the subset comprising inconsistent parameters depicted in FIG. 10.

Example 4

Figure 11:
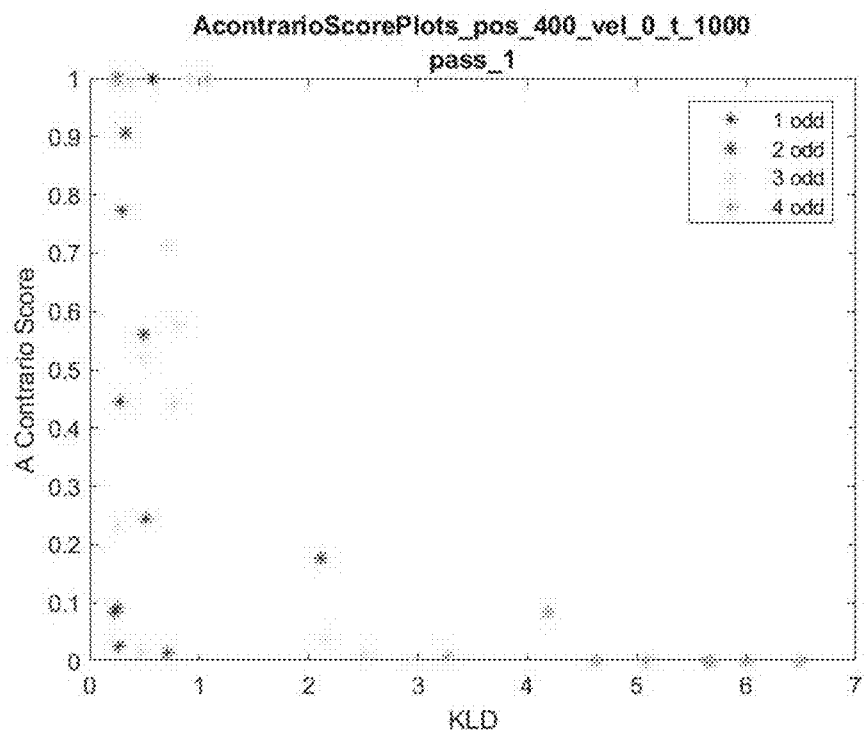
FIG. 11 illustrates determining an exemplary subset using an a contrario score and a KL divergence score for a receiver separation of 25 meters, according to some embodiments.
Figure 12:
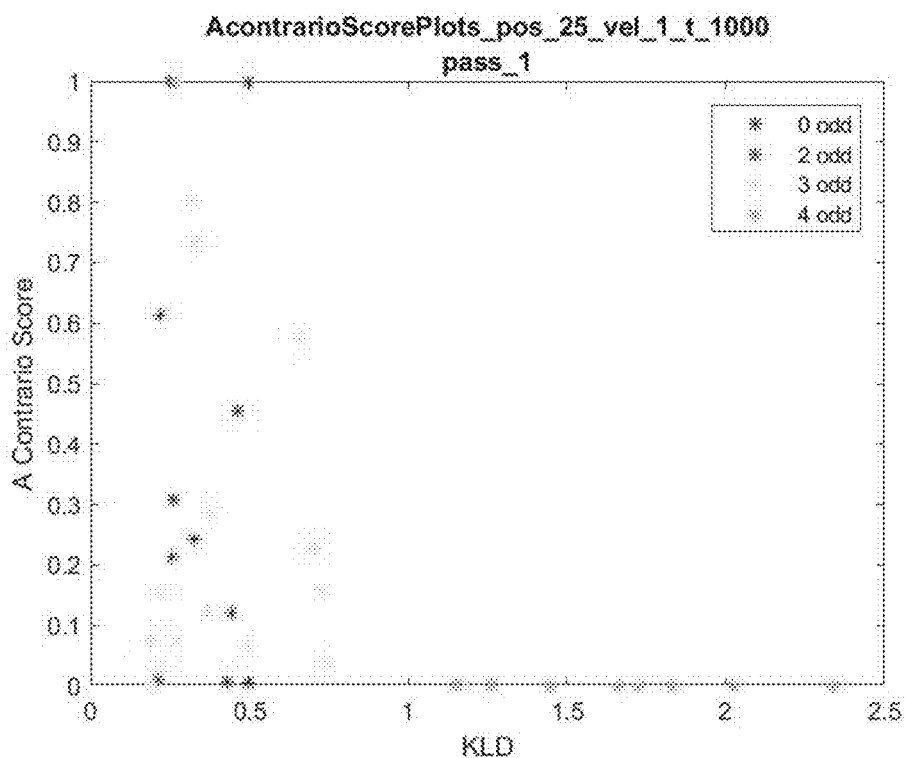
FIG. 12 illustrates determining an exemplary subset using an a contrario score and a KL divergence score for a receiver separation of 400 meters, according to some embodiments.

Methods for identifying an exemplary subset according to some embodiments are depicted in FIGS. 11 and 12. Both figures provide KL divergence scores along the x-axis and a contrario scores along the y-axis. FIG. 11 provides data for a stationary receiver and a receiver separation of 400 meters, and FIG. 12 provides data for a moving receiver and a receiver separation of 25 meters. As discussed above, an exemplary subset can be identified from a plurality of subsets comprising a low a contrario score and a high KL divergence score.

In both FIGS. 11 and 12, each subset is partitioned, or separated, from every other subset to a degree. For example, in each subset, most of the parameters comprising the subset are clustered together on the scatter plot. In both figures, the exemplary subset may be identified as the subset comprising a majority of its parameters in the bottom-right corner of the scatter plot (i.e., the location of the scatter plot reflecting a low a contrario score and a high KL divergence score. However, note that one parameter of this exemplary subset is located in the top-left corner of both scatter plots. Thus, the exemplary subset need not have each and every one of its parameters comprising a low a contrario score and a high KL divergence score.

The preceding description sets forth exemplary methods, parameters and the like. It should be recognized, however, that such description is not intended as a limitation on the scope of the present disclosure but is instead provided as a description of exemplary embodiments. The illustrative embodiments described above are not meant to be exhaustive or to limit the disclosure to the precise forms disclosed. Many modifications and variations are possible in view of the above teachings. The embodiments were chosen and described to best explain the principles of the disclosed techniques and their practical applications. Others skilled in the art are thereby enabled to best utilize the techniques, and various embodiments with various modifications as are suited to the particular use contemplated.

Although the disclosure and examples have been thoroughly described with reference to the accompanying figures, it is to be noted that various changes and modifications will become apparent to those skilled in the art. Such changes and modifications are to be understood as being included within the scope of the disclosure and examples as defined by the claims. In the preceding description of the disclosure and embodiments, reference is made to the accompanying drawings, in which are shown, by way of illustration, specific embodiments that can be practiced. It is to be understood that other embodiments and examples can be practiced, and changes can be made without departing from the scope of the present disclosure.

Although the preceding description uses terms first, second, etc. to describe various elements, these elements should not be limited by the terms. These terms are only used to distinguish one element from another.

Also, it is also to be understood that the singular forms "a," "an," and "the" used in the preceding description are intended to include the plural forms as well unless the context indicates otherwise. It is also to be understood that the term "and/or" as used herein refers to and encompasses any and all possible combinations of one or more of the associated listed items. It is further to be understood that the terms includes, "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

In some embodiments, a non-transitory computer-readable storage medium stores one or more programs configured to be executed by one or more processors of an electronic device with a display, the one or more programs including instructions for implementing any of the steps described or claimed herein. The present disclosure also relates to a device for performing the operations herein. This device may be specially constructed for the required purposes, or it may include a general-purpose computer selectively activated or reconfigured by a computer program stored in the computer. Such a computer program may be stored in a non-transitory, computer computer-readable storage medium, such as, but not limited to, any type of disk, including floppy disks, optical disks, CD-ROMs, magnetic-optical disks, read-only memories (ROMs), random access memories (RAMs), electrically program read-only memories (EPROMs), electronically erasable program read-only memories EEPROMs, magnetic or optical cards, application specific integrated circuits (ASICs), or any type of media suitable for storing electronic instructions, and each coupled to a computer system bus. Furthermore, the computers referenced in this disclosure may include a single processor or may be architectures employing multiple processor designs for increased computing capability.

The methods, devices, and systems described herein are not inherently related to any particular computer or other apparatus. Various general-purpose systems may also be used with programs in accordance with the teachings herein, or it may prove convenient to construct a more specialized apparatus to perform the required method steps. The required structure for a variety of these systems appears from the description above. Also, the present disclosure is not described with reference to any particular programming language. It will be appreciated that a variety of programming languages may be used to implement the teachings of the present disclosure as described herein.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims.

The invention claimed is:

1. A method of identifying correct satellite signals to improve the accuracy of a satellite navigation system comprising:
   receiving a plurality of satellite signals;
   demodulating the plurality of satellite signals to extract a first plurality of parameters;
   determining a first subset of parameters from the first plurality of parameters corresponding to the plurality of satellite signals, wherein the first subset of parameters is based on a first geographic location, comprising:
      calculating an a contrario score for one or more parameters of the first plurality of parameters outside the first subset;
      calculating a KL divergence score for one or more parameters of the first plurality of parameters outside the first subset; and
      identifying, based on the a contrario score and the KL divergence score, one or more inlier parameters from one or more parameters of the first plurality of parameters outside the first subset; and
   determining a second subset of parameters from a second plurality of parameters outside the first subset, the second plurality of parameters comprising one or more parameters of the first plurality of parameters outside the first subset, wherein the second subset of parameters is based on a second geographic location, comprising:
      calculating an a contrario score for one or more parameters of the second plurality of parameters outside the second subset;
      calculating a KL divergence score for one or more parameters of the second plurality of parameters outside the second subset; and
      identifying, based on the a contrario score and the KL divergence score, one or more inlier parameters of the second plurality of parameters; and
   identifying an exemplary subset from the first subset and the second subset based on the a contrario score and KL divergence score for the first subset and the second subset, wherein the exemplary subset comprises parameters corresponding to correct satellite signals.

2. The method of claim 1, wherein correct satellite signals comprise one or more of a multipath satellite signal or a line-of-sight satellite signal.

3. The method of claim 1, wherein determining a first subset of parameters from the first plurality of parameters corresponding to the plurality of satellite signals comprises calculating a state vector based on the parameters of the first subset, and determining a second subset of parameters from a second plurality of parameters comprises calculating a state vector based on the parameters of the second subset.

4. The method of claim 3, wherein determining a first subset of parameters from the first plurality of parameters corresponding to the plurality of satellite signals comprises:
   identifying four parameters based on a single geographic location from the first plurality of parameters; and
   verifying the state vector based on the parameters of the first subset using extrinsic information from one or more of an inertial measurement calculator, a clock, or a barometer.

5. The method of claim 3, wherein determining a first subset of parameters from the first plurality of parameters corresponding to the plurality of satellite signals comprises:
   identifying four parameters based on a single geographic location from the first plurality of parameters; and
   verifying the state vector based on the parameters of the first subset with a fifth measurement from the first plurality of parameters.

6. The method of claim 1, wherein the first plurality of parameters comprises one or more of pseudo-range or pseudo-range-rate parameters.

7. The method of claim 1, wherein the first geographic location and the second geographic location each comprise one of a legitimate geographic location, a spoofed geographic location, or a faulted geographic location.

8. The method of claim 7, comprising:
   from a third plurality of parameters, the third plurality of parameters outside the first subset of parameters and the second subset of parameters:
   identifying a fourth subset of parameters, wherein the fourth subset of parameters is based on two or more geographic locations.

9. The method of claim 7, wherein identifying an exemplary subset from the first subset and the second subset based on the a contrario score and KL divergence score for the first subset and the second subset comprises:
   identifying the exemplary subset from the first subset and the second subset, the exemplary subset having a lowest a contrario score and a highest KL divergence score; and
   identifying one or more consensus inlier parameters from the first plurality of parameters based on the exemplary subset having the lowest a contrario score and the highest KL divergence score.

10. The method of claim 1, wherein identifying an exemplary subset from the first subset and the second subset based on the a contrario score and KL divergence score for the first subset and the second subset comprises identifying consensus inlier parameters from the first plurality of parameters, wherein the exemplary subset and the consensus inlier parameters comprise parameters corresponding to correct satellite signals.

11. The method of claim 3, wherein calculating an a contrario score for one or more parameters of the first plurality of parameters outside the first subset comprises generating a chi-squared distribution based upon error measurements between the one or more parameters of the first plurality of parameters outside the first subset and predicted parameters based on the state vector corresponding to the first subset.

12. The method of claim 3, wherein the KL divergence score for one or more parameters of the first plurality of parameters outside the first subset is based on a distribution of the one or more parameters of the first plurality of parameters outside the first subset and a distribution of predicted parameters based on the state vector corresponding to the first subset.

13. A system of identifying correct satellite signals to improve the accuracy of a satellite navigation system comprising:
   one or more processors and memory storing one or more programs that when executed by the one or more processors cause the one or more processors to:
   receive a plurality of satellite signals;
   demodulate the plurality of satellite signals to form a first plurality of parameters corresponding to the plurality of satellite signals;
   determine a first subset of parameters from the first plurality of parameters corresponding to the plurality of satellite signals, wherein the first subset of parameters is based on a first geographic location, comprising:
  calculate an a contrario score for one or more parameters of the first plurality of parameters outside the first subset;
  calculate a KL divergence score for one or more parameters of the first plurality of parameters outside the first subset; and
  identify, based on the a contrario score and the KL divergence score, one or more inlier parameters from one or more parameters of the first plurality of parameters outside the first subset; and
determine a second subset of parameters from a second plurality of parameters outside the first subset, the second plurality of parameters comprising one or more parameters of the first plurality of parameters outside the first subset, wherein the second subset of parameters is based on a second geographic location, comprising:
  calculate an a contrario score for one or more parameters of the second plurality of parameters outside the second subset;
  calculate a KL divergence score for one or more parameters of the second plurality of parameters outside the second subset; and
  identify, based on the a contrario score and the KL divergence score, one or more inlier parameters of the second plurality of parameters; and
identify an exemplary subset from the first subset and the second subset based on the a contrario score and KL divergence score for the first subset and the second subset, wherein the exemplary subset comprises parameters corresponding to correct satellite signals.

14. The system of claim 13, wherein correct satellite signals comprise one or more of a multipath satellite signal or a line-of-sight satellite signal.

15. The system of claim 13, wherein determine a first subset of parameters from the first plurality of parameters corresponding to the plurality of satellite signals comprises calculate a state vector based on the parameters of the first subset, and determining a second subset of parameters from a second plurality of parameters comprises calculate a state vector based on the parameters of the second subset.

16. The system of claim 15, wherein determine a first subset of parameters from the first plurality of parameters corresponding to the plurality of satellite signals comprises:
  identify four parameters based on a single geographic location from the first plurality of parameters; and
  verify the state vector based on the parameters of the first subset with extrinsic information from one or more of an inertial measurement calculator, a clock, or a barometer.

17. The system of claim 15, wherein determine a first subset of parameters from the first plurality of parameters corresponding to the plurality of satellite signals comprises:
  identify four parameters based on a single geographic location from the first plurality of parameters; and
  verify the state vector based on the parameters of the first subset with a fifth measurement from the plurality of parameters.

18. The system of claim 15, wherein calculate an a contrario score for one or more parameters of the first plurality of parameters outside the first subset comprises generate a chi-squared distribution based upon error measurements between the one or more parameters of the first plurality of parameters outside the first subset and predicted parameters based on the state vector corresponding to the first subset.

19. The system of claim 15, wherein the KL divergence score for one or more parameters of the first plurality of parameters outside the first subset is based on a distribution of the one or more parameters of the first plurality of parameters outside the first subset and a distribution of predicted parameters based on the state vector corresponding to the first subset.

20. The system of claim 13, wherein the first plurality of parameters comprises one or more of pseudo-range or pseudo-range-rate parameters.

21. The system of claim 13, wherein the first geographic location and the second geographic location each comprise one of a legitimate geographic location, a spoofed geographic location, or a faulted geographic location.

22. The system of claim 21, comprising:
  from a third plurality of parameters, the third plurality of parameters outside the first subset of parameters and the second subset of parameters:
  identify a fourth subset of parameters, wherein the fourth subset of parameters is based on two or more geographic locations.

23. The system of claim 21, wherein identify an exemplary subset from the first subset and the second subset based on the a contrario score and KL divergence score for the first subset and the second subset comprises:
  identify the exemplary subset from the first subset and the second subset, the exemplary subset having a lowest a contrario score and a highest KL divergence score; and
  identify one or more consensus inlier parameters from the first plurality of parameters based on the exemplary subset having the lowest a contrario score and the highest KL divergence score.

24. The device of claim 21, wherein identify an exemplary subset from the first subset and the second subset based on the a contrario score and KL divergence score for the first subset and the second subset comprises:
  identify the exemplary subset from the first subset and the second subset, the exemplary subset having a lowest a contrario score and a highest KL divergence score; and
  identify one or more consensus inlier parameters from the first plurality of parameters based on the exemplary subset having the lowest a contrario score and the highest KL divergence score.

25. The system of claim 13, wherein identify an exemplary subset from the first subset and the second subset based on the a contrario score and KL divergence score for the first subset and the second subset comprises identify consensus inlier parameters from the first plurality of parameters, wherein the exemplary subset and the consensus inlier parameters comprise parameters corresponding to correct satellite signals.

26. The device of claim 13, wherein identify an exemplary subset from the first subset and the second subset based on the a contrario score and KL divergence score for the first subset and the second subset comprises identify consensus inlier parameters from the first plurality of parameters, wherein the exemplary subset and the consensus inlier parameters comprise parameters corresponding to correct satellite signals.

27. A device for identifying correct satellite signals to improve the accuracy of a satellite navigation system comprising:
  a receiver configured to receive a plurality of satellite signals;

a processor configured to:
  demodulate the plurality of satellite signals to form a first plurality of parameters corresponding to the plurality of satellite signals;
  determine a first subset of parameters from the first plurality of parameters corresponding to the plurality of satellite signals, wherein the first subset of parameters is based on a first geographic location, comprising:
    calculate an a contrario score for one or more parameters of the first plurality of parameters outside the first subset;
    calculate a KL divergence score for one or more parameters of the first plurality of parameters outside the first subset; and
    identify, based on the a contrario score and the KL divergence score, one or more inlier parameters from one or more parameters of the first plurality of parameters outside the first subset; and
  determine a second subset of parameters from a second plurality of parameters outside the first subset, the second plurality of parameters comprising one or more parameters of the first plurality of parameters outside the first subset, wherein the second subset of parameters is based on a second geographic location, comprising:
    calculate an a contrario score for one or more parameters of the second plurality of parameters outside the second subset;
    calculate a KL divergence score for one or more parameters of the second plurality of parameters; and
    identify, based on the a contrario score and the KL divergence score, one or more inlier parameters of the plurality of parameters outside the first subset;
  identify an exemplary subset from the first subset and the second subset based on the a contrario score and KL divergence score for the first subset and the second subset; and
a memory configured to store the exemplary subset, wherein the exemplary subset comprises parameters corresponding to correct satellite signals.

28. The device of claim 27, wherein correct satellite signals comprise one or more of a multipath satellite signal or a line-of-sight satellite signal.

29. The device of claim 27, wherein determine a first subset of parameters from the first plurality of parameters corresponding to the plurality of satellite signals comprises calculate a state vector based on the parameters of the first subset, and determine a second subset of parameters from a second plurality of parameters comprises calculate a state vector based on the parameters of the second subset.

30. The device of claim 29, wherein determine a first subset of parameters from the first plurality of parameters corresponding to the plurality of satellite signals comprises:
  identify four parameters based on a single geographic location from the first plurality of parameters; and
  verify the state vector based on the parameters of the first subset with extrinsic information from one or more of an inertial measurement calculator, a clock, or a barometer.

31. The device of claim 29, wherein determine a first subset of parameters from the first plurality of parameters corresponding to the plurality of satellite signals comprises:
  identify four parameters based on a single geographic location from the first plurality of parameters; and
  verify the state vector based on the parameters of the first subset with a fifth measurement from the first plurality of parameters.

32. The device of claim 29, wherein calculate an a contrario score for one or more parameters of the first plurality of parameters outside the first subset comprises generate a chi-squared distribution based upon error measurements between the one or more parameters of the first plurality of parameters outside the first subset and predicted parameters based on the state vector corresponding to the first subset.

33. The device of claim 27, wherein the KL divergence score for one or more parameters of the first plurality of parameters outside the first subset is based on a distribution of the one or more parameters of the first plurality of parameters outside the first subset and a distribution of predicted parameters based on the state vector corresponding to the first subset.

34. The device of claim 27, wherein the first plurality of parameters comprises one or more of pseudo-range or pseudo-range-rate parameters.

35. The device of claim 27, wherein the first geographic location and the second geographic location each comprise one of a legitimate geographic location, a spoofed geographic location, or a faulted geographic location.

36. The device of claim 35, comprising:
  from a third plurality of parameters, the third plurality of parameters outside the first subset of parameters and the second subset of parameters:
  identify a fourth subset of parameters, wherein the fourth subset of parameters is based on two or more geographic locations.

* * * * *